United States Patent
Raghavan et al.

(10) Patent No.: US 12,244,374 B2
(45) Date of Patent: Mar. 4, 2025

(54) ADAPTIVE BEAMFORMING FROM A CONFIGURED BEAM SUBSET

(71) Applicant: QUALCOMM Incorporated, San Diego, CA (US)

(72) Inventors: Vasanthan Raghavan, West Windsor Township, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/529,141

(22) Filed: Nov. 17, 2021

(65) Prior Publication Data

US 2023/0155651 A1 May 18, 2023

(51) Int. Cl.
| | |
|---|---|
| *H04B 7/06* | (2006.01) |
| *H04B 17/318* | (2015.01) |
| *H04L 5/00* | (2006.01) |
| *H04L 25/02* | (2006.01) |

(52) U.S. Cl.
CPC ......... *H04B 7/0617* (2013.01); *H04B 17/318* (2015.01); *H04L 5/0048* (2013.01); *H04L 25/021* (2013.01)

(58) Field of Classification Search
CPC .... H04B 7/0617; H04B 17/318; H04B 7/088; H04B 7/0695; H04B 7/0696; H04B 7/06952; H04B 7/06954; H04B 7/06956; H04B 7/06958; H04B 7/06962;
(Continued)

(56) References Cited

U.S. PATENT DOCUMENTS

| | | | | |
|---|---|---|---|---|
| 2006/0264184 | A1* | 11/2006 | Li | H04B 17/382 |
| | | | | 455/562.1 |
| 2013/0286960 | A1* | 10/2013 | Li | H04B 7/0684 |
| | | | | 370/329 |
| 2018/0048375 | A1 | 2/2018 | Guo et al. | |

(Continued)

OTHER PUBLICATIONS

International Search Report and Written Opinion dated Jan. 20, 2023 from corresponding PCT Application No. PCT/US2022/078614.

(Continued)

*Primary Examiner* — Sun Jong Kim
(74) *Attorney, Agent, or Firm* — Arun Swain

(57) ABSTRACT

Systems, methods, and apparatuses, including computer programs encoded on computer storage media, are directed to configuration of a beamforming vector using an estimated covariance matrix, which may reduce latency commensurate with a beam training procedure. An apparatus may receive, from another apparatus, information indicating a configured subset of a set of TX beams at the other apparatus. The other apparatus may transmit pilot signals via the configured subset of the set of TX beams. The apparatus may transmit, to the other apparatus, information associated with the set of beam pairs of the apparatus and the other apparatus. The apparatus may estimate a channel covariance matrix using the accumulated signal strength value, and may calculate a beamforming vector from the channel covariance matrix. The apparatus and the other apparatus may perform a beam training procedure using respective beamforming vectors.

23 Claims, 9 Drawing Sheets

(58) Field of Classification Search
CPC ............ H04B 7/06964; H04B 7/06966; H04B 7/06968; H04B 17/328; H04L 5/0048; H04L 25/021
See application file for complete search history.

(56) References Cited

U.S. PATENT DOCUMENTS

| | | | |
|---|---|---|---|
| 2019/0342871 A1* | 11/2019 | Tang | H04B 17/309 |
| 2020/0281011 A1* | 9/2020 | Xiong | H04W 72/20 |
| 2021/0384930 A1* | 12/2021 | Shikida | H04B 7/10 |
| 2023/0033028 A1* | 2/2023 | Wang | H04B 7/0617 |

OTHER PUBLICATIONS

Li Si et al: "Covariance Matrix Reconstruction for DOA Estimation in Hybrid Massive MIMO Systems", IEEE Wireless Communications Letters, IEEE, Piscataway, NJ, USA, vol. 9, No. 8, Apr. 1, 2020 (Apr. 1, 2020), pp. 1196-1200, XP011802050, ISSN: 2162-2337, DOI: 10.1109/LWC.2020.2985014 [retrieved on Aug. 6, 2020].

* cited by examiner

ADAPTIVE BEAMFORMING FROM A CONFIGURED BEAM SUBSET

TECHNICAL FIELD

The present disclosure generally relates to communication systems, and more particularly, to configuration of a subset of a set of beams that can be used to adaptively derive beam weights for beamformed communication in an access or other wireless network.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with the Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure, can be implemented in an apparatus. The apparatus can be a user equipment (UE) or a component thereof. The apparatus includes a processing system, a first interface, and a second interface. The processing system is configured to obtain, through a first interface, information obtained from another apparatus indicating a configured subset of a set of transmit (TX) beams at the other apparatus. The processing system is further configured to obtain, through the first interface, pilot signals obtained from the other apparatus corresponding to the configured subset of the set of TX beams, each of a set of signal strength values being associated with obtaining at least one of the pilot signals. The second interface is configured to output, to the other apparatus, an accumulated signal strength value associated with the set of signal strength values.

In some implementations, the processing system can be further configured to measure the set of signal strength values associated with obtaining the pilot signals from the other apparatus.

In some implementations, the information indicating the configured subset of the set of TX beams at the other apparatus can be included in a system information block (SIB), a pilot signal, or another broadcast transmission from the other apparatus.

In some implementations, the processing system can be further configured to sum the set of signal strength values to obtain the accumulated signal strength value.

In some implementations, the processing system can be further configured to estimate a channel covariance matrix using the accumulated signal strength value. The processing system can be further configured to calculate a beamforming vector for communication with the other apparatus using eigenvectors of the channel covariance matrix.

In some implementations, the processing system can be further configured to perform beam training with the other apparatus using the beamforming vector.

Another innovative aspect of the subject matter described in this disclosure can be implemented in another apparatus. The other apparatus can be a network entity (such as a node or a base station) or a component thereof. The other apparatus includes a first interface, a second interface, and a processing system. The first interface is connected to the processing system and is configured to output, to an apparatus, information indicating a configured subset of a set of TX beams at the other apparatus. The first interface is further configured to output, to the apparatus, one of a set of pilot signals via each TX beam of the configured subset of the set of TX beams. The processing system is configured to obtain, through the second interface, an accumulated signal strength value obtained from the apparatus associated with the set of pilot signals output via the configured subset of the set of TX beams.

In some implementations, the first interface can be further configured to output, to the apparatus, one of another set of pilot signals via each TX beam of the subset of the set of TX beams, and the accumulated signal strength value can be further associated with the other set of pilot signals output via the subset of the set of TX beams.

In some implementations, the first interface can be further configured to output, to the apparatus, another set of pilot signals via the set of TX beams. The second interface can be further configured to obtain, from the apparatus, information associated with a set of beam pairs of the other apparatus and the apparatus. The processing system can be further configured to configure the configured subset of the set of TX beams at the other apparatus from the set of beam pairs of the other apparatus and the apparatus.

In some implementations, the processing system can be further configured to calculate a norm of an error matrix associated with an identity matrix and TX beams of the set of beam pairs of the other apparatus and the apparatus, and the subset of the set of TX beams can be configured from comparison of the norm with a threshold.

In some implementations, the processing system can be further configured to perform beam training with the apparatus using the configured subset of the set of TX beams. The processing system can be further configured to calculate a beamforming vector for communication with the apparatus upon performing the beam training.

Another innovative aspect of the subject matter described in this disclosure can include a method implemented at an apparatus. The method includes receiving, from another apparatus, information indicating a configured subset of a set of TX beams at the other apparatus. The method further includes receiving, from the other apparatus, pilot signals corresponding to the configured subset of the set of TX beams, each of a set of signal strength values being associated with receiving at least one of the pilot signals. The method further includes transmitting, to the other apparatus, an accumulated signal strength value associated with the set of signal strength values.

Another innovative aspect of the subject matter described in this disclosure can include another method implemented at another apparatus. The other method includes transmitting, to an apparatus, information indicating a configured subset of a set of TX beams at the other apparatus. The other method further includes transmitting, to the apparatus, one of a set of pilot signals via each TX beam of the configured subset of the set of TX beams. The other method further includes receiving, from the apparatus, an accumulated signal strength value associated with the set of pilot signals transmitted via the configured subset of the set of TX beams.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
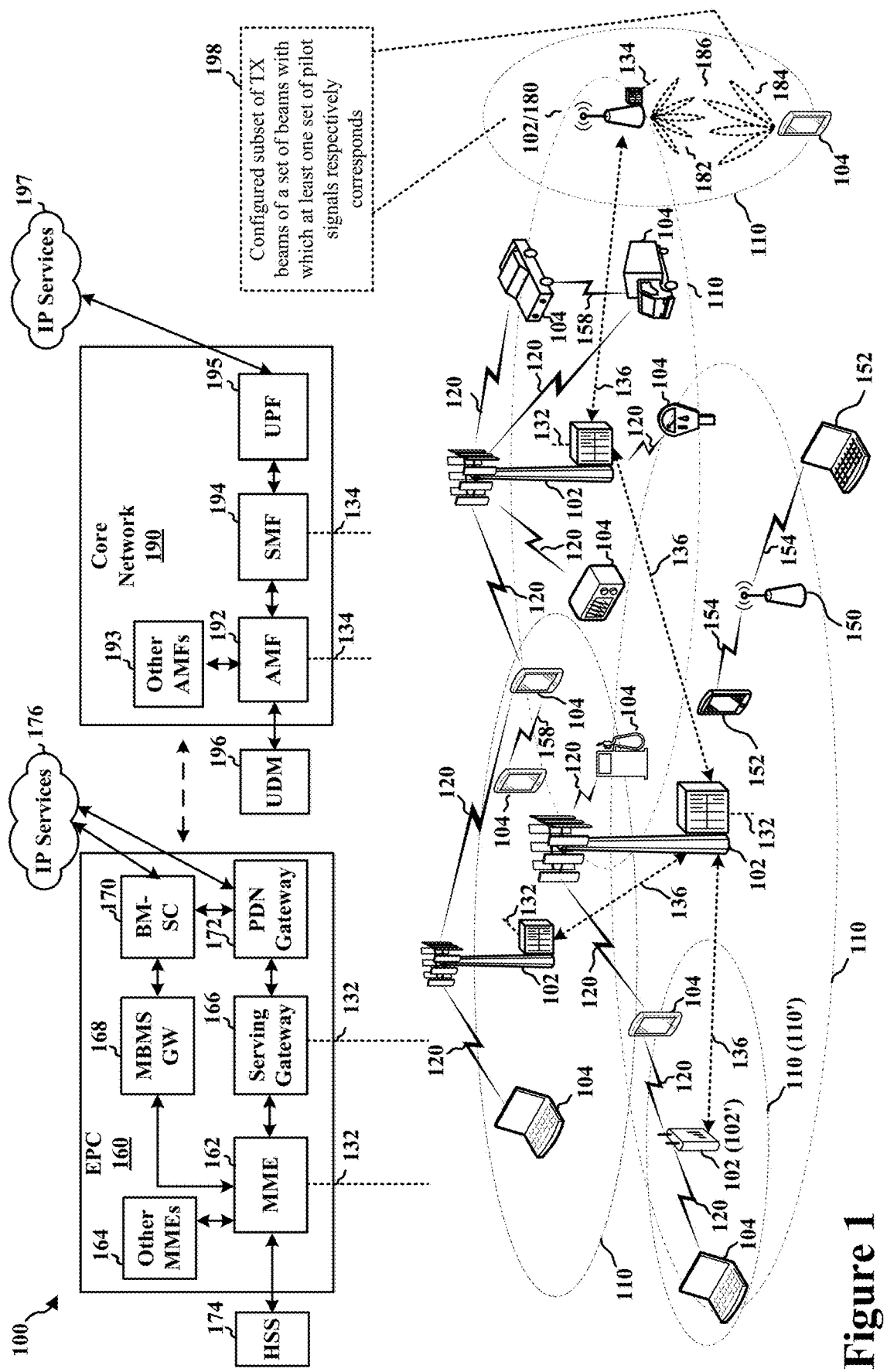
FIG. 1 shows a diagram of an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), LTE-Advanced (LTE-A), LTE in Unlicensed spectrum (LTE-U), License Assisted Access (LAA), AMPS, or other known signals that are used to communicate within a wireless, cellular, or Internet of Things (IoT) network, such as a system utilizing 3G, 4G, or 5G, or further implementations thereof, technology.

The present disclosure relates to beamformed communication in millimeter wave (also referred to as "mmWave" or simply "mmW") systems. In many such systems, a network entity and a UE may each utilize multiple antennas to achieve beamforming, which may bridge a link budget between the two. Some approaches to beamforming may include directional analog or radio-frequency (RF) beamforming, such as codebook-based beamforming, in which a (fixed) codebook is stored in respective memories at both the network entity and the UE, such as in an RF integrated circuit (RFIC).

For codebook-based beamforming, the network entity and the UE may perform beam training over the codewords set forth in the codebook. In some instances, beam training may be a multistage procedure that is hierarchically performed. For example, the network entity and the UE may begin with a first stage, which may be referred to as "P-1," in which the network entity performs TX beam sweeping to transmit a first set of pilot signals over some or all codewords of the codebook and the UE correspondingly performs RX beam sweeping to receive the first set of pilot signals over some or all of the codewords of the codebook. The UE measures a first set of signal strengths or channel qualities based on receiving the first set of pilot signals, and finds a broad or preliminary set of RX beams with which to receive signals from the network entity. Further, the UE reports some or all of the first set of signal strengths or channel qualities to the network entity, and in association therewith, the network entity may find a broad or preliminary set of TX beams with which to transmit signals to the UE.

At the second stage, which may be referred to as "P-2," the network entity performs TX beam sweeping to transmit a second set of pilot signals over some or all codewords of the codebook (in some instances, different or fewer codewords than those used in P-1) and the UE correspondingly performs RX beam sweeping to receive the second set of pilot signals over the codeword of the codebook estimated as best in P-1. The UE measures a second set of signal strengths or channel qualities based on receiving the second set of pilot signals, and reports some or all of the second set of signal strengths or channel qualities to the network entity. In association with the second set of signal strengths or channel qualities, the network entity may refine, such as by changing or confirming, the broad or preliminary set of TX beams found in P-1.

At the third stage, which may be referred to as "P-3," the network entity performs TX beam sweeping to transmit a third set of pilot signals over the codeword of the codebook estimated to be the best in P-2 and the UE correspondingly performs RX beam sweeping to receive the third set of pilot signals over some or all of the codewords of the codebook (in some instances, different or fewer codewords than those used in P-1). The UE measures a third set of signal strengths or channel qualities based on receiving the third set of pilot signals. Using the third set of signal strengths or channel qualities, the UE may refine, such as by changing or confirming, the broad or preliminary set of RX beams found in P-1.

Such a multistage hierarchical approach is directed to all directional beams, which may be suitable for some instances. However, this approach may incur appreciable overhead with respect to latency in typical millimeter wave channels corresponding to deployments that lead to multiple clusters in the channel model via multiple reflectors. In particular, the durations of beam sweeps in P-1, P-2, and P-3 may increase in proportion to the number of clusters. Potentially, the increased durations may exceed delay budgets or otherwise lead to a degradation of system or network performance. Therefore, a need exists to reduce the latency commensurate with beam management procedures, such in the aforementioned hierarchical approach to beam training or beam refinement.

In some circumstances, beam training or refinement may be a function of a respective number of antenna elements at each of the network entity and the UE. For example, bidirectional channel statistics may be leveraged for beam learning, between the network entity and the UE, having a duration that is quantifiable in the time domain as a number of time units (such as milliseconds (ms) or fractions thereof), a number of pilot signals, a number of symbols or other time resources (such as time resources configured to carry pilot signals), or any combination thereof. The duration may be given by Equation 1, shown below, in which M corresponds to the number of antenna elements of the UE and N corresponds to the number of antenna elements of the network entity:

$$((3N-2)M+3\ M-2)[units] \qquad \text{(Equation 1)}$$

According to various aspects provided herein, latency incurred through bidirectional beam learning, such as that given by Equation 1, may be reduced. In particular, the present disclosure provides for techniques and approaches to learning beam weights in a manner(s) that reduces the overhead that would have otherwise accompanied various beam training and refinement procedures, such as the above-described hierarchical approach having multiple stages P-1, P-2, and P-3.

Similar to the units via which results of Equation 1 can be expressed, some aspects of the present disclosure describe latency expressed in terms of a number of time units (such as ms or fractions thereof), a number of pilot signals, a number of symbols or other time resources, or any combination thereof. However, the latency (if any) incurred during implementation of the concepts and various aspects of the present disclosure may be less than the result of Equation 1, given the same parameters.

For example, a network entity may sweep through a set of TX beams at the network entity, transmitting each of a first set of pilot signals via each of the set of TX beams. The network entity may broadcast the first set of pilot signals, such as with synchronization signal blocks (SSBs), or the network entity may unicast the first set of pilot signals, such as with channel-state information (CSI) reference signals (RSs) (CSI-RSs). The network entity may repeat this beam sweeping procedure one or more additional times, so that the network entity transmits a respective pilot signal via each of the set of TX beams for each beam sweeping repetition.

In some instances, each set of signals transmitted via the TX beams of the network entity may be referred to as a "burst." For example, for a network entity that includes a set of four TX beams identified as TX1, TX2, TX3, and TX4, a burst would include the set of pilot signals transmitted via TX1, TX2, TX3, and TX4 according to a beam sweeping pattern. Illustratively, the network entity may configure a beam sweeping pattern TX4-TX2-TX1-TX3, and thus, one burst would include one set of pilot signals sequentially transmitted via TX4, TX2, TX1, and TX3 at a first time period $t_x$, and the next burst would include the next set of pilot signals sequentially transmitted via TX4, TX2, TX1, and TX3 at the next consecutive time period $t_{x+1}$. Other terminology may be used herein to refer to the same or similar concept(s). For example, in the context of a beam sweeping procedure, a "repetition" or an "iteration" may each be used to refer to the sequential transmission of one set of pilot signals according to a beam sweeping pattern.

Correspondingly, the UE may sweep through a set of RX beams at the UE, in order to pair each of the set of RX beams at the UE with a set of TX beams of the network entity. To do so, the UE maintains the same RX beam over a burst during which the network entity transmits a set of pilot signals via each of the set of TX beams. In some aspects, the UE may follow a beam sweeping pattern defining the sequence of RX beams the UE is to use to receive bursts of pilot signals. The beam sweeping pattern followed by the UE may be different from the beam sweeping pattern followed by the network entity.

For example, the UE may include RX beams RX1 and RX2, and may be configured with an RX beam sweeping pattern RX1-RX2. Over a first time period $t_0$, the network entity may sweep through the set of TX beams according to the TX beam sweeping pattern TX4-TX2-TX1-TX3 to respectively transmit the first set of pilot signals via the set of TX beams. Also, over the first time period $t_0$, the UE receives the first set of pilot signals via RX1, which the UE maintains while the network entity completes one repetition of a beam sweeping pattern. Over a second time period $t_1$, the network entity may repeat the beam sweep so that a second set of pilot signals is transmitted via the set of TX beams. For this second burst over the second time period $t_1$, however, the UE may switch to RX2 according to the RX beam sweeping pattern. Thus, the UE may receive the second set of pilot signals via RX2. The UE may repeat the foregoing process for each of a set of RX beams, with the UE switching to another one of the set of RX beams between bursts of the sets pilot signals according to the sequence defined by an RX beam sweeping pattern.

For each of the pilot signals received via the set of RX beams, the UE may measure at least one value indicative of a signal strength or a channel quality, such as reference signal received power (RSRP), reference signal received quality (RSRQ), signal-to-noise ratio (SNR), signal-to-interference-plus-noise ratio (SINR), reference signal strength indicator (RSSI), channel quality indicator (CQI), another value indicative of signal strength or channel quality, or any combination thereof. The UE may store each measured value with information indicating an association with at least one of the respective one of the TX beams via which the pilot signal was transmitted (which the UE may identify from information conveyed via the pilot signal, via at least one resource carrying the pilot signal, or via another means) and the respective one of the RX beams via which the pilot signal was received. In this way, the UE may find the "best" pairs of TX beams and RX beams, which may include multipath components that are not necessarily line-of-sight (LoS), particularly in multi-cluster environments with reflective surfaces or diffractive sources.

Continuing with the aforementioned example, over the first time period to, the UE may respectively measure four RSRP values for the beam pairs TX4/RX1, TX2/RX1, TX1/RX1, and TX3/RX1 as the first set of pilot signals is received. Over the second time period $t_1$, the UE may again respectively measure four RSRP values for the beam pairs TX4/RX2, TX2/RX2, TX1/RX2, and TX3/RX2 as the second set of pilot signals is received. Accordingly, the UE may select the best beam pairs based on the eight measured RSRP values.

The UE may report, to the network entity, information indicating one or more of the set of TX beams that are associated with one or more of the highest or acceptable measured values. For example, the UE may report a certain number of TX beams associated with the highest or acceptable measured values, such as a threshold number of beam pairs associated with the highest measured values relative to the other beam pairs or a number of beam pairs associated with measured values that satisfy another threshold.

Accordingly, the network entity may use the reported information to select a subset of the set of TX beams. However, the network entity does not necessarily need to select the subset of TX beams from those TX beams reported by the UE. In some aspects, the network entity may select a subset of the set of TX beams that are approaching orthogonality with respect to one another. That is, the subset of the set of TX beams may approximate a unitary matrix when the TX beam vectors are combined with one another. This approximation could be in either 2-norm, infinite-norm, Frobenius norm, or in any other validly defined matrix norm function.

The network entity may transmit, to the UE, information indicating the selected subset of the set of TX beams. Further, the network entity may transmit pilot signals to the UE by sweeping over the subset of the set of TX beams. Associated with the received information, the UE may receive the pilot signals while holding one beam constant over a burst of the pilot signals transmitted via the subset of TX beams. In so doing, the UE may measure another respective value indicative of signal strength or channel quality for each TX/RX beam pair. Illustratively, where the network entity configures a subset of Q TX beams, the UE may measure Q values for each RX beam.

In association with a respective set of other measured values, the UE may calculate another accumulated value. However, rather than calculate an accumulated value corresponding to each TX beam, the UE may calculate another accumulated value corresponding to each RX beam. In some aspects, each other accumulated value may be a summation function of the other measured values measured from pilot signals transmitted over the subset of TX beams while holding an RX beam constant.

The other accumulated values, such as accumulated RSRP values, may function as an estimation of a covariance matrix at the UE. Accordingly, the UE may calculate, ascertain, obtain, select or determine the dominant eigenvector of the estimated covariance matrix, and the UE may use the dominant eigenvector to adaptively configure the beam weights at the UE estimated to correspond with the best or highest channel properties. With the adaptively configured beam weights, the UE may perform further beam training with the network entity. For example, the UE may perform uplink beam training with the network entity by transmitting uplink signals, such as sounding reference signals (SRSs), to the network entity in association with the adaptive beam weights.

Correspondingly, the network entity may receive the uplink signals from the UE and based thereon, the network entity may adaptively configure beam weights at the network entity for communication with the UE. The network entity may be able to find the beam weights to use for communication with the UE in a duration that is quantifiable in the time domain as a number of time units (such as ms or fractions thereof), a number of pilot signals, a number of symbols or other time resources (such as time resources configured to carry pilot signals), or any combination thereof. The duration may be given by Equation 2, shown below, in which N corresponds to the number of antenna elements of the network entity:

$$(3N-2)[\text{units}] \qquad (\text{Equation 2})$$

Similarly, the UE may be able to find the beam weights to use for communication with the network entity in another duration that is quantifiable in the time domain. This other duration at the UE may be given by Equation 3, shown below, in which M corresponds to the number of antenna elements of the UE:

$$(3M-2)[\text{units}] \qquad (\text{Equation 3})$$

In the aggregate, the total time (latency overhead) for both the UE and the network entity to adaptively configure beam weights for communication with one another may be given by Equation 4:

$$(3M+3N-4)[\text{units}] \qquad (\text{Equation 4})$$

Equation 4 exhibits linear growth according to antenna dimensionality, which is in contrast to the quadratic growth exhibited by Equation 1, shown above.

Particular implementations of the subject matter described in this disclosure can be implemented to realize one or more of the following potential advantages. Some implementations of the subject matter described in the present disclosure may reduce the complexity associated with certain beam management procedures. For example, the number of beam pairs over which beam training is performed may be reduced relative to that of existing or conventional beam training. Potentially, the lower complexity of some implementations of the subject matter described herein may translate to lower power consumption at the systems and devices at which such implementations are realized. For example, generating and using each of a number of beams for beam management procedures may consume some amount of power, and therefore, generating and using fewer than that number of beams for beam management procedures may result in a relatively lower amount of power being consumed.

Some implementations of the subject matter described in the present disclosure may mitigate the latency commensurate with beam management procedures. In particular, the overhead (in time) associated with configuring beam weights for communication between a UE and a network entity may be shown to be a linear growth function of antenna dimensionality when such beam weights are adaptively configured according to the subject matter of the present disclosure. In contrast, some existing or alternative approaches to configuring beam weights, such as bidirectional beam training, may exhibit quadratic growth with respect to antenna dimensionality. Therefore, as antenna dimensionality increases, the latency incurred through the techniques and solutions of the present disclosure may be demonstrably lower than those of other approaches to beam learning.

Some implementations of the subject matter described in the present disclosure may improve the quality of communication between systems and devices in radio access and other wireless networks. As described herein, the subject matter of the present disclosure may be implemented to adaptively configure beam weights for beamformed communication. Such adaptive configurations of beam weights may be performed faster or more frequently than some existing or conventional approaches to setting beam weights. Therefore, some particular implementations of the present subject matter may allow for more frequent determination of beams associated with better (or the best) channel properties in the immediate environment.

FIG. 1 is a diagram illustrating an example of a wireless communications system and an access network 100. The wireless communications system (also referred to as a wireless wide area network (WWAN)) includes network entities 102, user equipment(s) (UE) 104, an Evolved Packet Core (EPC) 160, and another core network 190 (such as a 5G Core (5GC)). The network entities 102 may include macrocells (such as high power cellular base stations) or small cells (such as low power cellular base stations). The network entities 102 of some or all of the macrocells can include base stations. The network entities 102 of some or all of the small cells can include femtocells, picocells, and microcells.

The network entities 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (such as an S1 interface). The network entities 102 configured for 5G New Radio (NR), which may be collectively referred to as Next Generation radio access network (RAN) (NG-RAN), may interface with core network 190 through second backhaul links 134. In addition to other functions, the network entities 102 may perform one or more of the following functions: transfer of user data, radio channel ciphering and deciphering, integrity protection, header compression, mobility control functions (such as handover or dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the network entities 102 may communicate directly or indirectly (such as through the EPC 160 or core network 190) with each other over third backhaul links 136 (such as an X2 interface). Some or all of the first backhaul links 132, the second backhaul links 134, or the third backhaul links 136 may be wired, wireless, or some combination thereof. At least some of the network entities 102 may be configured for integrated access and backhaul (IAB). Accordingly, such network entities may wirelessly communicate with other network entities, which also may be configured for IAB.

At least some of the network entities 102 configured for IAB may have a split architecture that includes at least one of a central unit (CU), a distributed unit (DU), a radio unit (RU), a remote radio head (RRH), or a remote unit, some or all of which may be collocated or distributed or may communicate with one another. In some configurations of such a split architecture, a CU may implement some or all functionality of a radio resource control (RRC) layer, whereas a DU may implement some or all of the functionality of a radio link control (RLC) layer.

Illustratively, some of the network entities 102 configured for IAB may communicate through a respective CU with a DU of an IAB donor node or other parent IAB node (such as a base station), and further, may communicate through a respective DU with child IAB nodes (such as other base stations) or one or more of the UEs 104. One or more of the network entities 102 configured for IAB may be an IAB donor connected through a CU with at least one of the EPC 160 or the core network 190. With such a connection to the EPC 160 or core network 190, a network entity 102 operating as an IAB donor may provide a link to the EPC 160 or core network 190 for one or more UEs or other IAB nodes, which may be directly or indirectly connected (such as separated from an IAB donor by more than one hop) with the IAB donor. In the context of communicating with the EPC 160 or the core network 190, both the UEs and IAB nodes may communicate with a DU of an IAB donor.

As described herein, a network entity, such as a network entity 102 or a network entity 180, may include components that are located at a single physical location or components located at various physical locations. In examples in which a network entity includes components that are located at various physical locations, the various components may each perform various functions such that, collectively, the various components achieve functionality that is similar to a network entity that is located at a single physical location. As such, a network entity described herein may equivalently refer to a standalone apparatus or device, such as a monolithic base station, or an apparatus or device that includes components that are located at various physical locations or virtualized locations. In some implementations, such a network entity including components that are located at various physical locations may be referred to as or may be associated with a disaggregated RAN, for example, in which one or more of the network entities 102 may be configured with connectivity in an open RAN (ORAN) or a virtualized RAN (VRAN) enabled through at least one respective CU, DU, RU, RRH, or remote unit.

The network entities 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the network entities 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations (such as one or more of the network entities 102). A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the network entities 102 and the UEs 104 may include uplink (also referred to as reverse link) transmissions from a UE 104 to a network entity 102 or downlink (also referred to as forward link) transmissions from a network entity 102 to a UE 104. The communication links 120 may use multiple-input and multiple-output (MIMO) antenna technology, including spatial multiplexing, beamforming, or transmit diversity. Wireless links or radio links may be on one or more carriers, or component carriers (CCs). The network entities 102 or UEs 104 may use spectrum up to Y megahertz (MHz) (in some examples, Y may be equal to or approximately equal to 5, 10, 15, 20, 100, 400, etc.) bandwidth per carrier allocated in a carrier aggregation of up to a total of Yx MHz (such as x CCs) used for transmission in each direction. The CCs may or may not be adjacent to each other. Allocation of CCs may be asymmetric with respect to downlink and uplink (in various examples, more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a network entity (such as a gNB or other base station) at the access network level and to at least one core network entity (such as the AMF or MME) at the core network level, and the UE may be configured to receive downlink control information in the access network (such as where the UE is in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, such as in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same unlicensed frequency spectrum (such as 5 GHz or the like) as used by the Wi-Fi AP 150. The small cell 102', employing NR in an unlicensed frequency spectrum, may boost coverage to or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band. With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, or frequencies that may be within the EHF band.

A network entity 102, whether a small cell 102' or a large cell (such as a macro base station), may include or may be referred to as an eNB, gNodeB (gNB), another type of base station, or another type of network node that communicates over the air interface or provides a link to the EPC 160 or the core network 190. Some network entities 180, such as gNBs, may operate in a traditional sub 6 GHz spectrum, in mmW frequencies, or near-mmW frequencies in communication with the UE 104. When such a network entity 180 (such as a gNB) operates in mmW or near-mmW frequencies, the network entity 180 may include a mmW network entity, such as a mmW base station. The (mmW) network entity 180 may utilize beamforming 186 with the UE 104 to compensate for the path loss and short range. The network entity 180 and the UE 104 may each include a plurality of antennas, such as antenna elements, antenna panels, or antenna arrays to facilitate the beamforming.

The network entity 180 may transmit a beamformed signal to the UE 104 via one or more transmit (TX) beams of the beams 182 (that is, in one or more beamformed TX directions). The UE 104 may receive the beamformed signal from the network entity 180 via one or more receive (RX) beams of the beams 184 (that is, in one or more beamformed RX directions). The UE 104 may also transmit a beamformed signal to the network entity 180 via one or more TX beams of the beams 184 (that is, in one or more beamformed TX directions). The network entity 180 may receive the beamformed signal from the UE 104 via one or more RX beams of the beams 182 (that is, in one or more beamformed RX directions). One or both of the network entity 180 or the UE 104 may perform beam training or beam refinement to select, identify, or otherwise determine the "best" TX or RX beam(s) of the beams 182 or the "best" RX or TX beam(s) of the beams 184, respectively, which may correspond to beamformed directions on which the highest signal strength or channel quality is detected for the one or both of the network entity 180 or UE 104. The TX and RX directions for the network entity 180 may or may not be the same; that is, the network entity 180 may select, identify, or otherwise determine the "best" TX beam(s) of the beams 182 for transmission, which may be different from the RX beam(s) of the beams 182 that the network entity 180 selects, identifies, or otherwise determines is "best" for reception. Similarly, the TX and RX directions for the UE 104 may or may not be the same; that is, the UE 104 may select, identify, or otherwise determine the "best" RX beam(s) of the beams 184 for reception, which may be different from the TX beam(s) of the beams 184 that the UE 104 selects, identifies, or otherwise determines is "best" for transmission.

In various different aspects, one or more of the network entities 102/180 may include or may be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the network entities 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a Packet Switch (PS) Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the network entities 102 belonging to a Multicast Broadcast Single Frequency Network (MBSFN) area broadcasting a particular service, and may be responsible for session management (start/stop) and for collecting eMBMS related charging information.

In some other aspects, one or more of the network entities 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, or other IP services.

In certain aspects, a network entity 102/180 may be configured to transmit, to a UE 104, information indicating a configured subset of TX beams 198 of the set of beams 182. The network entity 102/180 may be further configured to transmit, to the UE 104, one of a set of pilot signals via each TX beam of the configured subset of TX beams 198. The network entity 102/180 may be further configured to receive, from the UE 104, an accumulated signal strength value associated with the set of pilot signals transmitted via the configured subset of TX beams 198.

In certain other aspects, the UE 104 may be configured to receive, from the network entity 102/180, information indicating the configured subset of TX beams 198 of the set of beams 182 of the network entity 102/180. The UE 104 may be further configured to receive, from the network entity 102/180, the pilot signals corresponding to the configured subset of TX beams 198, and each of a set of signal strength values may be associated with receiving at least one of the pilot signals. The UE 104 may be further configured to transmit, to the network entity 102/180, the accumulated signal strength value associated with the set of signal strength values.

Additional or other concepts and aspects related to adaptive beamforming using a subset of a set of beams are further described herein. Although the present disclosure may focus on 5G NR, the concepts and various aspects described herein may be applicable to other similar areas, such as LTE, LTE-A, LTE-U, LAA, CDMA, GSM, or other wireless/radio access technologies.

Figure 2:
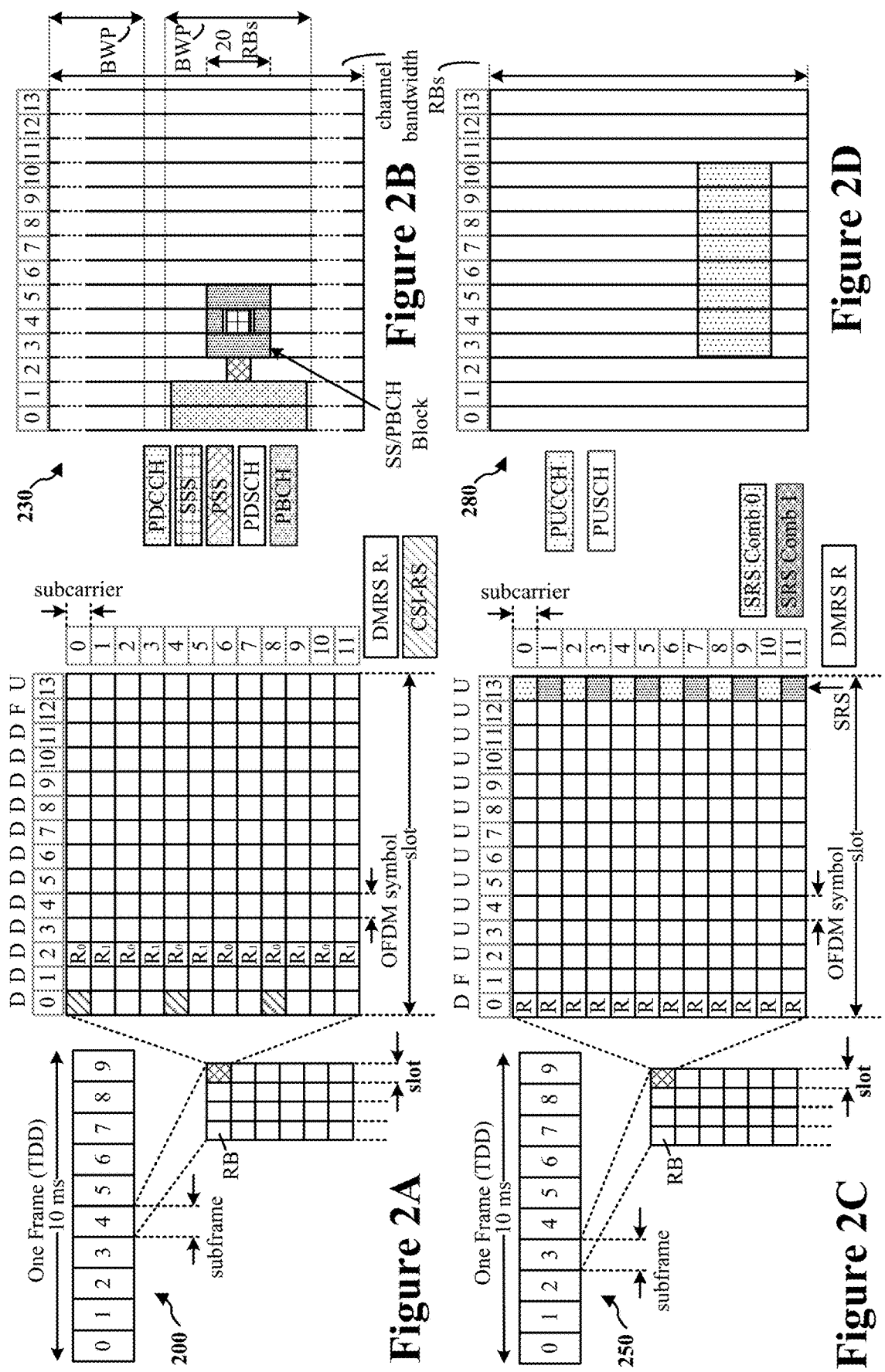
FIG. 2A shows a diagram of an example of a first frame.
FIG. 2B shows a diagram of an example of downlink channels within a subframe.
FIG. 2C shows a diagram of an example of a second frame.
FIG. 2D shows a diagram of an example of uplink channels within a subframe.

FIG. 2A is a diagram illustrating an example of a first subframe 200 within a 5G NR frame structure. FIG. 2B is a diagram illustrating an example of downlink channels within a 5G NR subframe 230. FIG. 2C is a diagram illustrating an example of a second subframe 250 within a 5G NR frame structure. FIG. 2D is a diagram illustrating an example of uplink channels within a 5G NR subframe 280. The 5GNR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description provided herein may also apply to a 5G NR frame structure that is TDD.

Other wireless communication technologies may have a different frame structure or different channels. A frame, which may be of 10 ms, may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is associated with the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing.

FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, or other such purposes. In some configurations, an RS may include at least one demodulation RS (DM-RS) (indicated as Rx for one particular configuration, where 100x is the port number, but other DM-RS configurations are possible) or at least one channel state information (CSI) RS (CSI-RS) for channel estimation at the UE. In some other configurations, an RS may additionally or alternatively include at least one beam measurement (or management) RS (BRS), at least one beam refinement RS (BRRS), or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater or lower frequencies across the channel bandwidth.

A primary synchronization signal (PSS) may be within symbol 2 of particular subframes of a frame. The PSS is used by a UE 104 to acquire, synchronize, or otherwise determine subframe/symbol timing and a physical layer identity. A secondary synchronization signal (SSS) may be within symbol 4 of particular subframes of a frame. The SSS is used by a UE to find, identify, or otherwise determine a physical layer cell identity group number and radio frame timing. Associated with the physical layer identity and the physical layer cell identity group number, the UE can identify, calculate, or otherwise determine a physical cell identifier (PCI). Associated with on the PCI, the UE can find, locate, calculate, or otherwise determine the locations of the aforementioned DM-RS.

The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used.

The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), or UCI.

Figure 3:
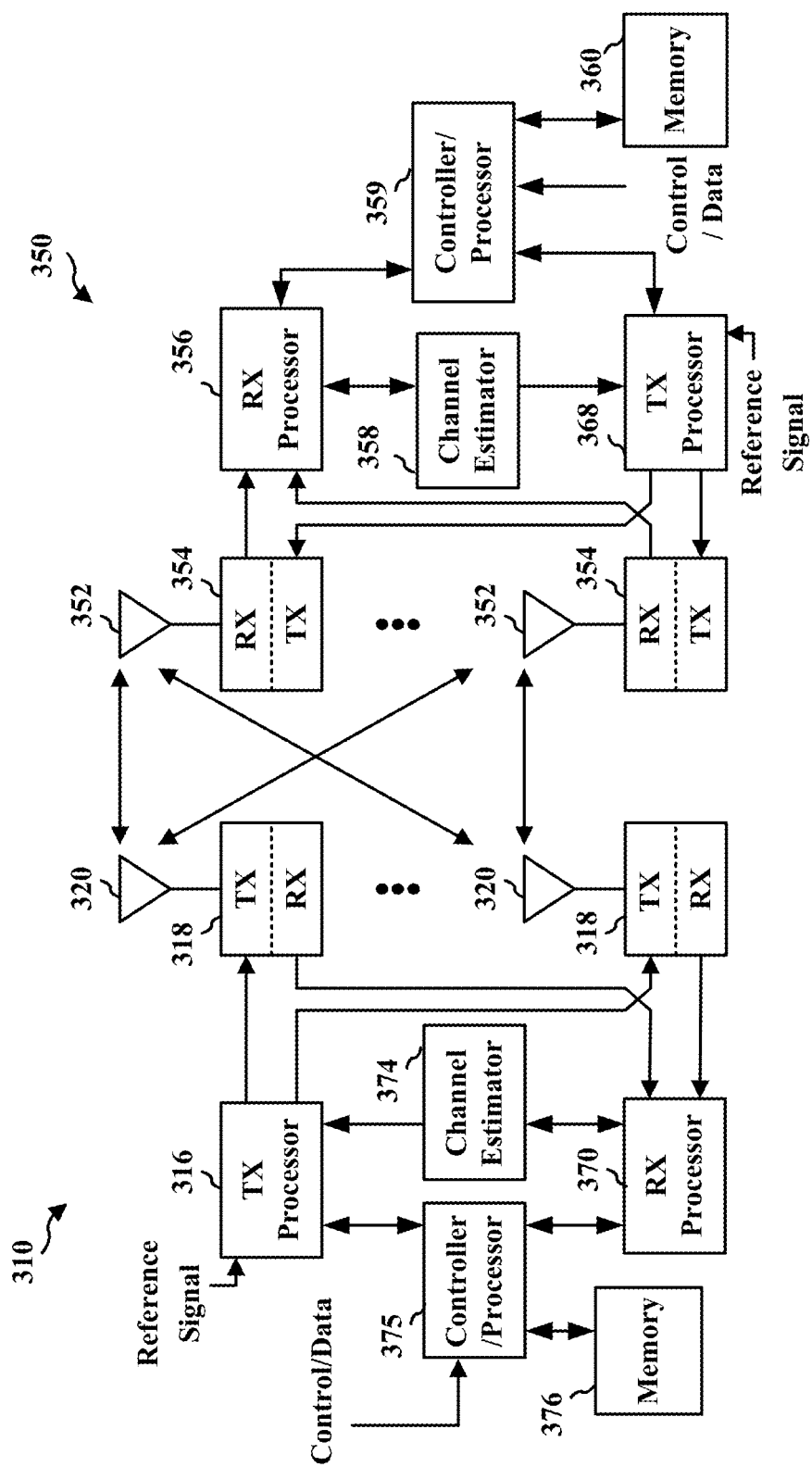
FIG. 3 shows a diagram of an example of a network entity and user equipment (UE) in an access network.

FIG. 3 is a block diagram of a network entity 310 in communication with a UE 350 in an access network 300. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer.

The controller/processor 375 provides RRC layer functionality associated with broadcasting of system information (such as a MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations associated with various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams.

Each stream may be mapped to an OFDM subcarrier, multiplexed with a reference signal (or another pilot signal) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to select, estimate, or otherwise determine the coding and modulation scheme, as well as for spatial processing.

The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by estimating, calculating, or otherwise determining the most likely signal constellation points transmitted by the network entity 310. These soft decisions may be associated with channel estimates computed by the channel estimator 358. The soft decisions are decoded and deinterleaved to recover the data and control signals that were originally transmitted by the network entity 310 on the physical channel. The data and control signals are provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK/NACK protocol to support HARQ operations.

Similar to the functionality described in connection with the downlink transmission by the network entity 310, the controller/processor 359 provides RRC layer functionality associated with system information (such as a MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network entity 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the network entity 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK/NACK protocol to support HARQ operations.

In some aspects, at least one of the TX processor 368, the RX processor 356, and the controller/processor 359 may be configured to perform aspects in connection with the configured subset of TX beams 198 shown in FIG. 1.

In some other aspects, at least one of the TX processor 316, the RX processor 370, and the controller/processor 375 may be configured to perform aspects in connection with the configured subset of TX beams 198 shown in FIG. 1.

Figure 4:
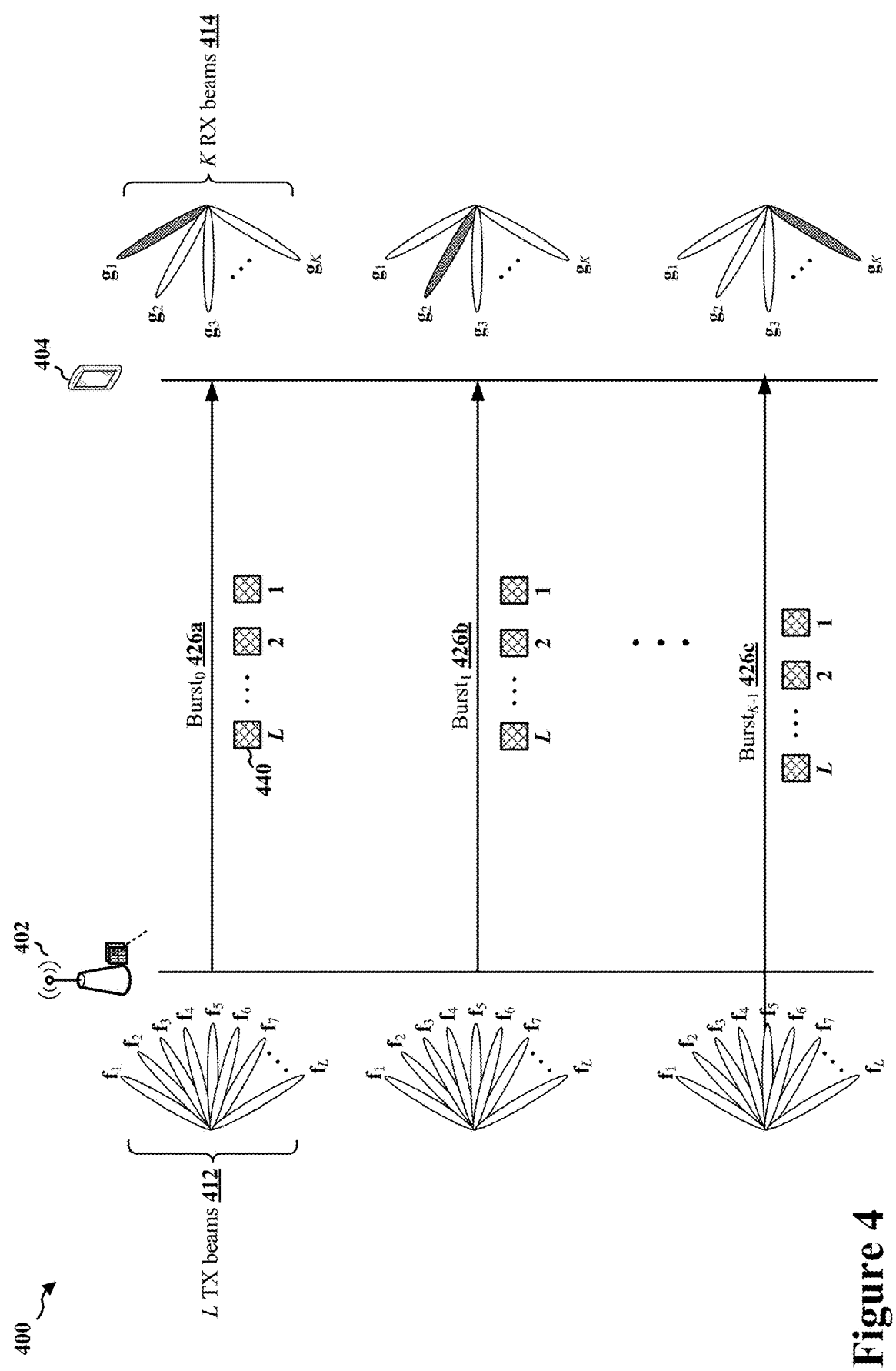
FIG. 4 shows a call flow diagram of an example portion of a beam management procedure for adaptive beam weight configurations of a network entity and a UE.

FIG. 4 shows a call flow diagram of an example portion of a beam management procedure 400 for adaptive beam weight configurations of a network entity 402 and a UE 404. In some implementations, the network entity 402 may include N antenna elements, to which an N×1 beamforming vector can be applied to generate a beam (such as a TX beam). The network entity 402 may have a certain number of TX beams available to use for downlink communication with a UE 404. For example, the network entity 402 may have up to, and including, sixty-four (64) beams, one hundred and twenty-eight (128) beams, or another number with which to communicate with the UE 404.

Similarly, the UE 404 may include M antenna elements, to which an M×1 beamforming vector can be applied to generate a beam (such as an RX beam). The UE 404 may have a certain number of RX beams available to receive downlink communication from the network entity 402, such as eight (8), sixteen (16), or thirty-two (32), although other numbers of beams are contemplated to be within the scope of the present disclosure. In some aspects, the number M of antenna elements at the UE 404 may be less than the number N of antenna elements at the network entity 402 (although not necessarily), and in such cases, the number of beams that the UE 404 may generate using the M antenna elements may be less than the number of beams that the network entity 402 may generate.

The network entity 402 may be configured to transmit pilot signals 440 via a set of TX beams 412. The network entity 402 may transmit the pilot signals 440 in bursts, with each burst including a set of pilot signals transmitted via some or all of the set of TX beams 412. According to various aspects of the present disclosure, the pilot signals 440 may include SSBs, CSI-RSs, DM-RSs, or another reference or synchronization signal. The network entity 402 may be configured to broadcast or unicast the pilot signals 440.

In some aspects, the network entity 402 may periodically transmit bursts of pilot signals. For example, where the pilot signals 440 include SSBs, the network entity 402 may repeat a burst transmission at a certain periodicity, such as 1.25 ms, 5 ms, 10 ms, 20 ms, or another periodicity. In some other aspects, the network entity 402 may aperiodically transmit bursts of pilot signals. For example, burst transmission by the network entity 402 may be event driven.

The set of TX beams 412 may include a number L of TX beams, with L being less than or equal to a TX beam threshold, such as sixty-four (64). In some aspects, the network entity 402 may transmit information indicating the set of L TX beams 412 to the UE 404, such as in a SIB, a DCI message, or another broadcast or unicast message. In some other aspects, the UE 404 may be configured to find some or all of the set of L TX beams 412, for example, in association with information conveyed by the pilot signals 440 or the resources on which the pilot signals 440 are carried.

In some aspects, the network entity 402 may transmit a respective subset of the set of pilot signals on set of resources that indicates an index or other identifier (ID) of each of the set of L TX beams 412. For example, at least one of a symbol, slot, subframe, frame, subcarrier, BWP, RE, or PRB may indicate a beam index or beam ID. Thus, pilot signals transmitted via a beam $f_1$ of the set of TX beams 412 may be transmitted on sets of resource that maps to $f_1$, regardless of whether such pilot signals are transmitted in $burst_0$ 426a, $burst_1$ 426b, $burst_{K-1}$ 426c, or another burst.

In some other aspects, each of the subsets of the set of pilot signals transmitted via a respective one of the set of TX beams 412 may indicate the beam index or ID of the respective beam. In still other aspects, a combination of the resources on which pilot signals are transmitted and resources on which pilot signals are carried may indicate the TX beams via which the pilot signals are respectively transmitted.

When the UE 404 is within a geographic coverage area of the network entity 402, the UE 404 may be able to receive bursts of pilot signals from the network entity 402. The UE 404 may include a certain number of beams that may be selected to be used to receive beamformed signals from the network entity 402. For example, the UE 404 may include a set of K RX beams 414 via which the UE 404 receives beamformed signals transmitted by the network entity 402 via the set of L TX beams 412. The number K of the set of RX beams 414 may be less than the number L of the set of TX beams 412 (although not necessarily).

In some aspects, the network entity 402 may transmit each of the bursts 426a-426c according to a beam sweeping pattern in which the network entity 402 sweeps over the set of TX beams 412 to sequentially transmit a respective subset of a set of pilot signals via each TX beam of the set of TX beams 412 in an order established by the beam sweeping pattern. For example, the beam sweeping pattern may define a sequential numerical order (or similar sequential order) according to which the network entity 402 begins a burst transmission by sweeping over $f_1$, and sweeping over $f_2$, $f_3$, and so forth, until concluding the burst transmission by transmitting a subset of the set of pilot signals via beam $f_L$.

The UE 404 may similarly sweep over the set of RX beams 414. Rather than sweep over a set of beams in each burst transmission, however, the UE 404 may sweep over the set of RX beams 414 across K burst transmissions. For each individual burst transmission, the UE 404 may hold one of the set of RX beams 414 constant. In so doing, the UE 404 may attempt to receive pilot signals transmitted via all of the set of TX beams 412 via a respective one of the set of RX beams 414.

Illustratively, $burst_0$ 426a includes a set of pilot signals transmitted by the network entity 402, where the network entity 402 transmits a respective subset of the set of pilot signals via each of the set of TX beams 412. To receive $burst_0$ 426a, the UE 404 may hold beam $g_1$ constant over the entire $burst_0$ 426a. Thus, the UE 404 may receive one or more subsets of the set of pilot signals via $g_1$.

For each subset of the set of pilot signals transmitted via a respective TX beam of the set of TX beams 412 in $burst_0$ 426a and received by the UE 404 via $g_1$, the UE 404 may measure a value corresponding to a beam pair that includes the respective TX beam and $g_1$ of the set of RX beams 414. Accordingly, the UE 404 may measure up to L values for each of the set of L TX beams 412 paired with $g_1$ of the set of RX beams 414. Potentially, the UE 404 may measure less than L values where the UE 404 fails to successfully receive pilot signals transmitted via one or more of the set of L TX beams 412.

According to various aspects, for each of the set of TX beams 412, $f_1, f_2, \ldots, f_L$, paired with each of the set of RX beams 414, $g_1, g_2, \ldots, g_K$, the UE 404 may measure a value of at least one of an RSRP (such as an L1-RSRP or an SS-RSRP), RSRQ, RSSI, SNR, SINR, or another value of indicative of channel quality or signal strength, or any combination thereof. For example, the UE 404 may measure an RSRP value over a given pair of an RX beam, g, and a TX beam, f, according to Equation 5, shown below:

$$RSRP = \sum_k |g^H H(k) f|^2 \quad \text{(Equation 5)}$$
$$= \sum_k |f^H H(k)^H g|^2$$
$$= \sum_k f^H H(k)^H g \cdot g^H H(k) f$$
$$= f^H \cdot \left( \sum_k H(k)^H g \cdot g^H H(k) \right) \cdot f$$

In Equation 5, $f^H$ and $g^H$ are the complex conjugate Hermitians of the beamforming vectors of f and g, respectively. Further, k is a subcarrier, and H(k) is the complex channel matrix at the $k^{th}$ subcarrier. Thus, $H(k)^H$ is the complex conjugate Hermitian of the channel matrix at the $k^{th}$ subcarrier.

Following $burst_0$ 426a, the network entity 402 may transmit a second set of pilot signals of $burst_1$ 426b, where a respective subset of the second set of pilot signals is transmitted via each of the set of TX beams 412. To receive $burst_1$ 426b, the UE may switch from $g_1$ to $g_2$, which may be the next consecutive RX beam in a sequence of RX beams defined by a beam sweeping pattern. The UE 404 may hold $g_2$ constant over the entire $burst_1$ 426b. Accordingly, the UE 404 may receive one or more subsets of the second set of pilot signals via $g_2$.

For each subset of the second set of pilot signals transmitted via a respective TX beam of the set of TX beams 412 in $burst_1$ 426b and received by the UE 404 via $g_2$, the UE 404 may measure a value corresponding to a beam pair that includes the respective TX beam and $g_2$ of the set of RX beams 414. Thus, the UE 404 may measure up to L values for each of the set of L TX beams 412 paired with $g_2$ of the set of RX beams 414.

The UE 404 may repeat this procedure over the remaining K-2 beams. Accordingly, the UE 404 may receive pilot signals of $burst_{K-1}$ 426c via $g_K$ of the set of RX beams 414, which the UE 404 may hold constant over the burst. In so doing, the UE 404 may measure values respectively corresponding to beam pairs that each include one of set of TX beams 412 and $g_K$ of the set of RX beams 414. In this way, the UE 404 may measure up to L values for each of the set of the set of K RX beams 414.

Following $burst_{K-1}$ 426c, the UE 404 may have recorded up to K·L measured values respectively corresponding to the K·L beam pairs. Using the measured values for each of the beam pairs, the UE 404 may select, identify, or otherwise determine one or more of the beam pairs having the highest or best measured values. In some aspects, the UE 404 may compare each of the measured values to one another in order to identify the P highest or best measured values indicative of signal strength or channel quality. The UE 404 may select P beam pairs respectively corresponding to the highest or best measured values in relative comparison with the other measured values corresponding to the unselected beam pairs. In some other aspects, the UE 404 may select one or more of the P beam pairs in association with the orthogonality of TX beams to one another, even though the selected one or more beams may not necessarily be associated with the highest or best measured values.

In such other aspects, the network entity 402 may transmit information to the UE 404 indicating one or more subsets of the set of TX beams 412 that are orthogonal or nearly orthogonal to one another. For example, the network entity 402 may include such information in a SIB or other message, which may allow the UE 404 to prioritize or otherwise give greater weight to the one or more (nearly) orthogonal subsets of the set of TX beams 412.

In some aspects, the number P of beam pairs selected by the UE 404 may be configured by the network entity 402. The network entity 402 may transmit information indicating the number P of beams to be reported by the UE 404, such as to reduce overhead associated with beam management. For example, P may be equal to four (4). In other examples, P may be greater than or less than four (4). In some other aspects, the number P of beam pairs selected by the UE 404 may be stored in memory or other storage of the UE 404 according to a standard or technical specification.

Figure 5:
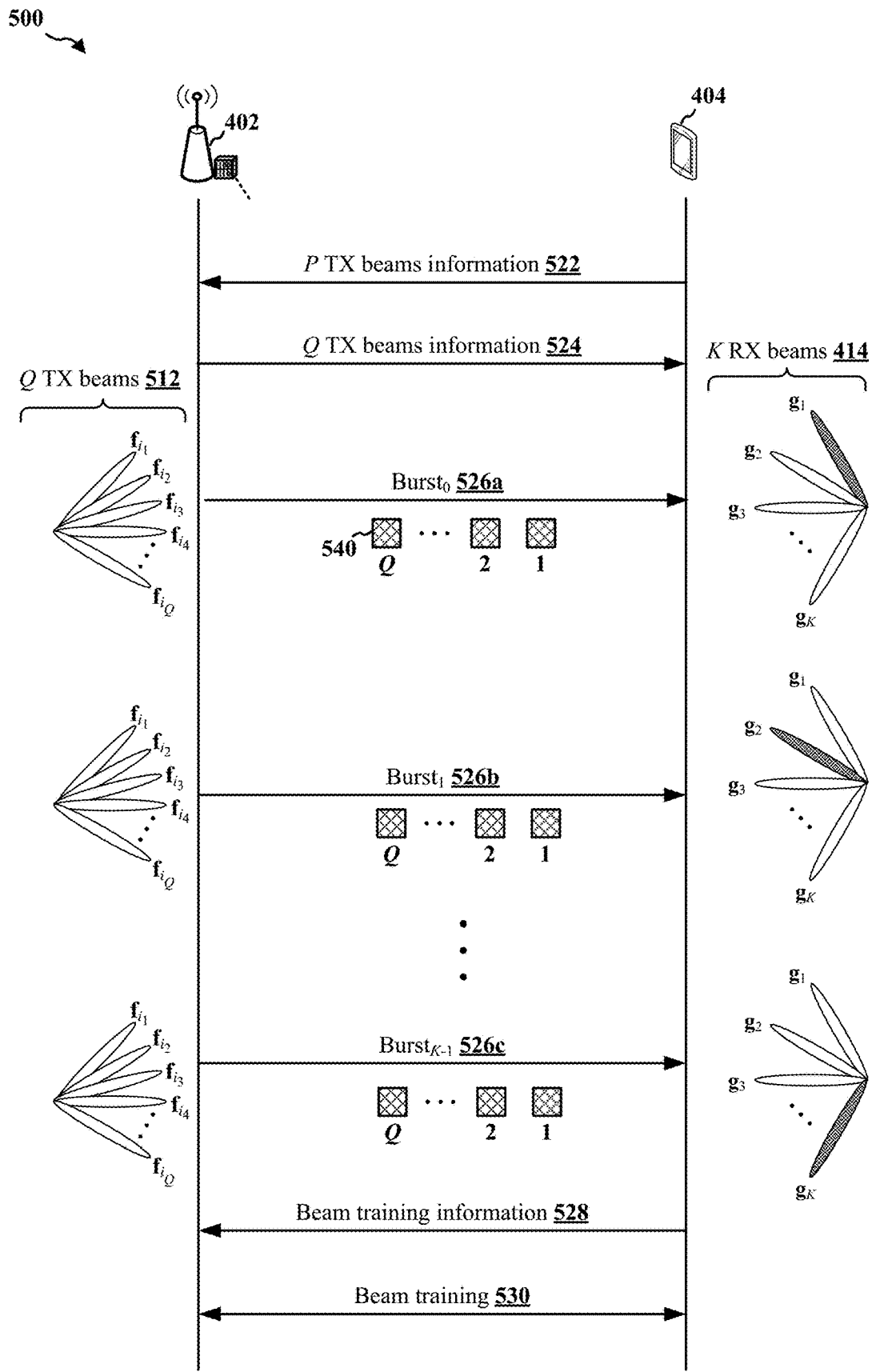
FIG. 5 shows a call flow diagram of an example of configuration of adaptive beam weights for a network entity and a UE using of a subset of transmit (TX) beams of a set of TX beams.

FIG. 5 shows a call flow diagram illustrates an example of adaptive beam weight configurations 500 for a network entity 402 and a UE 404 using of a subset of TX beams 512 of a set of TX beams 412. Further to FIG. 4 and as illustrated by FIG. 5, the UE 404 may transmit, to the network entity 402, information 522 indicating P TX beams of the P beam pairs. The network entity 402 may receive the P TX beams information 522 indicating the P TX beams of the set of L TX beams 412, and based thereon, the network entity 402 may estimate, calculate, or otherwise determine which of the L TX beams (that is, which of $f_1$, $f_2$, . . . , $f_L$) acceptably approximates a unitary matrix for the UE 404. From such an acceptable approximation of a unitary matrix for the UE 404, the network entity 402 may transmit information indicating a subset of Q TX beams 512 of the set of L TX beams 412 (where Q is less than L).

In some aspects, the network entity 402 may select, identify, or otherwise determine a subset of Q TX beams 512 from the set of L TX beams 412 based on approximation of a unitary matrix for the UE 404. In particular, the network entity 402 may select, identify, or otherwise determine $i_1$, . . . , $i_Q$ associated with the reported P TX beams information 522 using Equation 6, shown below:

$$\left\| I - \sum_{j=1}^{Q} f_{i_j} f_{i_j}^H \right\| \quad \text{(Equation 6)}$$

In Equation 6, I is an identity matrix, $f_i$ is the N×1 beamforming vector of one of the set of L TX beams 412, and $f_i^H$ is the complex conjugate Hermitian of the N×1 beamforming vector of the one of the set of L TX beams 412. According to various different aspects, the norm of Equation 6 may be any suitable norm, such as the 2-norm, Frobenius norm, infinity norm, or another validly defined matrix norm.

The network entity 402 may calculate Equation 6 such that the norm associated with the error in the approximation is minimized. For example, the network entity 402 may calculate the norm according to Equation 6 for one or more subsets of the set of L TX beams 412, $f_1$, $f_2$, . . . , $f_L$. In association with the calculations of the norms, the network entity 402 may select a subset of Q TX beams 512, $f_{i_1}$, $f_{i_2}$, . . . , $f_{i_Q}$, of the set of L TX beams 412, $f_1$, $f_2$, . . . , $f_L$, which may be a set of Q TX beams having the minimal calculated norm (in relative comparison to other subsets of the set of L TX beams 412).

In some aspects, the network entity 402 may select a subset of Q TX beams 512 of the set of L TX beams 412 based on a threshold. For example, the network entity 402 may use Equation 6 to calculate the norms associated with one or more subsets of the set of L TX beams 412, $f_1$, $f_2, \ldots, f_L$, and the network entity 402 may select a subset of Q TX beams 512, $f_{i_1}, f_{i_2}, \ldots, f_{i_Q}$, associated with a calculated norm that is below the threshold.

In some aspects, the number Q of the subset of TX beams selected from the set of L TX beams 412 may not necessarily be statically defined, but may be dependent upon a number of TX beams that satisfy a threshold criteria or other criteria. In some other aspects, however, the number Q of the subset of TX beams selected from the set of L TX beams 412 may be stored in memory or other storage of the network entity 402. For example, the number Q of the subset of TX beams selected from the set of L TX beams 412 may be specified by a standard or other technical specification and hardcoded into memory of the network entity 402. The network entity 402 may transmit information indicating Q to the UE 404, such as in an SSB, MIB, or SIB. Potentially, however, the number Q of the subset of TX beams selected from the set of L TX beams 412 may be specified by a standard or other technical specification and hardcoded into memory of the UE 404.

Using Equation 6 to find the minimized norm associated with the Q TX beams 512, $f_{i_1}, f_{i_2}, \ldots, f_{i_Q}$, may imply that the beamforming vectors $f_{i_1}, f_{i_2}, \ldots, f_{i_Q}$ approximate a unitary matrix, and therefore, the Q TX beams 512, $f_{i_1}, f_{i_2}, \ldots, f_{i_Q}$, may be approximately orthogonal to one another. In effect, the Q TX beams 512, $f_{i_1}, f_{i_2}, \ldots, f_{i_Q}$, may represent the total energy on resources for the UE 404 from the perspective of the network entity 402. Thus, the TX beam of the set of L TX beams 412 providing the "best" (or satisfactory) channel properties may be found in the subset of Q TX beams 512 of the set of L TX beams 412.

In some aspects, the network entity 402 may be configured to select the Q TX beams 512 from the P TX beams reported by the UE 404 in the P TX beams information 522. Consequently, other TX beams may exist in the set of L TX beams 412 that may provide better orthogonality approximation; however, the Q TX beams 512 provide the closest approximation of orthogonality given the constraint that the Q TX beams 512 be selected from the P TX beams reported by the UE 404. In some other aspects, the network entity 402 may be configured to select at least one of the Q TX beams 512 from the P TX beams reported by the UE 404 in the P TX beams information 522.

In still other aspects, the network entity 402 does not necessarily need to select any of the Q TX beams 512 from the P TX beams reported by the UE 404 in the P TX beams information 522. Rather, the network entity 402 may select any of the set of TX beams 412, regardless of whether the TX beam is indicated by the P TX beams information 522, for example, with the criteria that the selected Q TX beams 512 provide the best approximation of the unitary matrix. For example, the network entity 402 may select the Q TX beams 512 in association with one or more CSI reports including at least one of CSI, PMI, or RI. In another example, the network entity 402 may select the Q TX beams 512 associated with measurements reported by the UE 404, such as one or more values indicating RSRP, RSRQ, RSSI, SNR, SINR, or another metric associated with receiving SSBs or CSI-RSs by the UE 404.

In still other examples, the network entity 402 may select the Q TX beams 512 associated with an accumulated value, reported by the UE 404, that is a function of multiple measured values. The UE 404 may calculate an accumulated value using multiple measured values measured over multiple beam pairs. In some aspects, the UE 404 may calculate an accumulated value for each of the set of TX beams of the network entity 402 based on the measured values measured over each of the set of RX beams 414 of the UE 404 from the pilot signals 440 transmitted via a respective one of the TX beams 412. Each of the accumulated values may be found as a summation function of the measured values respectively measured over the set of RX beams 414 when paired with a respective one of the set of TX beams 412, for example, according to Equation 7, shown below:

$$\sum_{i=1}^{L} RSRP_i = \sum_{i=1}^{L} f^H \cdot \left( \sum_k H(k)^H g_i \cdot g_i^H H(k) \right) \cdot f \qquad \text{(Equation 7)}$$

$$= f^H \cdot \left( \sum_k H(k)^H \cdot \left( \sum_{i=1}^{L} g_i g_i^H \right) \cdot H(k) \right) \cdot f$$

$$= f^H \cdot \left( \sum_k H(k)^H H(k) \right) \cdot f$$

In Equation 7, f is the beamforming vector of a given one of the set of L TX beams 412, and $g_i$ is the beamforming vector of one of the set of K RX beams 414 at the $i^{th}$ position. Accordingly, $f^H$ and $g^H$ are the complex conjugate Hermitians of the beamforming vectors of f and g, respectively. Further, k is a subcarrier, and H(k) is the complex channel matrix at the $k^{th}$ subcarrier. Thus, $H(k)^H$ is the complex conjugate Hermitian of the complex channel matrix at the $k^{th}$ subcarrier. The accumulated values—in this example, accumulated RSRP values—may function as an estimation of a covariance matrix at the network entity 402.

The network entity 402 may transmit Q TX beams' information 524 to the UE 404 upon selection of the Q TX beams 512 in order to indicate the same to the UE 404. The UE 404 may receive the Q TX beams information 524, and based thereon, the UE 404 may be configured to receive additional sets of pilot signals 540 via the set of K RX beams 414. The additional sets of pilot signals 540 may include SSBs, CSI-RSs, DM-RSs, or another reference or synchronization signal. In some aspects, the pilot signals 540 may include signals of a different type than those transmitted via the set of L TX beams 412 from which the network entity selects the Q TX beams 512.

Similar to the above-described beam sweeping procedures, the network entity 402 may transmit K bursts 526a-526c according to a beam sweeping pattern in which the network entity 402 sweeps over the subset of Q TX beams 512 of the set of L TX beams 412 to sequentially transmit a respective subset of a set of pilot signals via each TX beam of the Q TX beams 512 in an order established by the beam sweeping pattern. Correspondingly, the UE 404 may sweep over the set of RX beams 414, holding one of the set of RX beams 414 constant at each of the K bursts 526a-526c. In so doing, the UE 404 may attempt to receive pilot signals transmitted via all of the Q TX beams 512 via a respective one of the set of K RX beams 414.

In some aspects, one or both of the beam sweeping patterns according to which the network entity 402 and the UE 404 sweep over beams for the bursts 526a-526c on the Q TX beams 512 may be different from the beam sweeping patterns according to which the network entity 402 and the UE 404 sweep over beams for the bursts 426a-426c on the set of L TX beams 412. For example, a first beam sweeping pattern may be configured for measurement and reporting of pilot signals 440 transmitted via the set of L TX beams 412, whereas a second beam sweeping pattern may be configured for at least one of orthogonality and signal strength with the pilot signals 540 transmitted via the Q TX beams 512.

According to a beam sweeping pattern, the network entity 402 may transmit $burst_0$ 526a, which includes a set of pilot signals, via each of the Q TX beams 512. To receive $burst_0$ 526a, the UE 404 may hold beam $g_1$ constant over the entire $burst_0$ 526a. Thus, the UE 404 may receive one or more of the Q subsets of the set of pilot signals via $g_1$.

For each subset of the set of pilot signals transmitted via a respective TX beam of the Q TX beams 512, $f_{i_1}, f_{i_2}, \ldots, f_{i_Q}$, in $burst_0$ 526a and received by the UE 404 via $g_1$, the UE 404 may measure a value corresponding to a beam pair that includes the respective TX beam and $g_1$ of the set of RX beams 414. Accordingly, the UE 404 may measure up to Q values for each of the Q TX beams 512 paired with $g_1$ of the set of RX beams 414.

According to various aspects, for each of the Q TX beams 512, $f_{i_1}, f_{i_2}, \ldots, f_{i_Q}$, paired with each of the set of RX beams 414, $g_1, g_2, \ldots, g_K$, the UE 404 may measure a value of at least one of an RSRP (such as an L1-RSRP or an SS-RSRP), RSRQ, RSSI, SNR, SINR, or another value of indicative of channel quality or signal strength, or any combination thereof. For example, the UE 404 may measure an RSRP value over a given pair of an RX beam, g, and a TX beam, f, according to Equation 5, shown above.

Following $burst_0$ 526a, the network entity 402 may transmit a second set of pilot signals of $burst_1$ 526b, where a respective subset of the second set of pilot signals is transmitted via each of the Q TX beams 512. To receive $burst_1$ 526b, the UE may switch from $g_1$ to $g_2$, which may be the next consecutive RX beam in a sequence of RX beams defined by a beam sweeping pattern. The UE 404 may hold $g_2$ constant over the entire $burst_1$ 526b. Accordingly, the UE 404 may receive one or more subsets of the second set of pilot signals via $g_2$.

For each subset of the second set of pilot signals transmitted via a respective TX beam of the Q TX beams 512 in $burst_1$ 526b and received by the UE 404 via $g_2$, the UE 404 may measure a value corresponding to a beam pair that includes the respective TX beam and $g_2$ of the set of RX beams 414. Thus, the UE 404 may measure up to Q values for each of the set of L TX beams 412 paired with $g_2$ of the set of RX beams 414.

The UE 404 may repeat this procedure over the remaining K-2 beams. Accordingly, the UE 404 may receive pilot signals of $burst_{K-1}$ 526c via $g_K$ of the set of RX beams 414, which the UE 404 may hold constant over the burst. In so doing, the UE 404 may measure values respectively corresponding to beam pairs that each include one of Q TX beams 512 and $g_K$ of the set of RX beams 414. In this way, the UE 404 may measure up to Q values for each of the set of the set of K RX beams 414.

Following $burst_{K-1}$ 526c, the UE 404 may have recorded up to K·Q measured values respectively corresponding to the K·Q beam pairs. Using the measured values for each of the beam pairs, the UE 404 may calculate an accumulated signal strength value that is a function of multiple measured values. The UE 404 may calculate an accumulated signal strength value using multiple measured values measured over multiple beam pairs. In some aspects, the UE 404 may calculate an accumulated signal strength value for each of the K RX beams of the UE 404 based on the measured values measured from the pilot signals 540 transmitted via each of the Q TX beams 512 and received via a respective one of the set of RX beams 414 of the UE 404. Each of the accumulated values may be found as a summation function of the measured values respectively measured over the Q TX beams 512 when paired with a respective one of the set of RX beams 414, for example, according to Equation 8, shown below:

$$\sum_{i=1}^{Q} RSRP_{i_j} = \sum_{j=1}^{Q} \sum_k |g^H H(k) f_{i_j}|^2 \qquad \text{(Equation 8)}$$
$$= \sum_k g^H H(k) \cdot \left(\sum_{j=1}^{Q} f_{i_j} f_{i_j}^H\right) \cdot H(k)^H g$$
$$\approx g^H \cdot \left(\sum_k H(k)^H H(k)\right) \cdot g$$

In Equation 8, g is the beamforming vector of a given one of the set of K RX beams 414, and $f_{i_j}$ is the beamforming vector of one of the set of Q TX beams 512 at the $j^{th}$ position. Accordingly, $f^H$ and $g^H$ are the Hermitians of the beamforming vectors of f and g, respectively. Further, k is a subcarrier, and H(k) is the channel matrix at the $k^{th}$ subcarrier. Thus, $H(k)^H$ is the Hermitian of the channel matrix at the $k^{th}$ subcarrier.

The UE 404 may estimate a UE-side covariance matrix, R, shown below by Equation 9, using the accumulated signal strength values, each of which may be found by accumulating the measured signal strength values for the set of beam pairs that includes a respective one of the set of RX beams 414, g, paired with each of the Q TX beams 512, $f_{i_1}, f_{i_2}, \ldots, f_{i_Q}$ (as shown above by Equation 8).

$$R = \sum_k H(k) H(k)^H \qquad \text{(Equation 9)}$$

Where the UE 404 includes a set of antenna elements, the UE 404 may calculate a beamforming vector, which may effectively translate to a set of beam weights, for communication with the network entity 402 in 3 M−2 sets of pilot signals (although a set may include only a single pilot signal). Specifically, the UE 404 may find the covariance matrix, R, at the UE side in 3 M−2 sets of pilot signals. The UE 404 may calculate, select, or otherwise determine the dominant eigenvector of the covariance matrix, R, at the UE side, which may be used for beamforming vector design at the UE 404 to obtain a set of beam weights for the UE 404.

Further, the UE 404 may transmit beam training information 528 to the network entity 402, which the network entity 402 may receive for use in finding beam weights at the network entity 402. In some aspects, the beam training information 528 may indicate the accumulated signal strength value found by accumulating the measured signal strength values for the set of beam pairs that includes a respective one of the set of RX beams 414, g, paired with each of the Q TX beams 512, $f_{i_1}, f_{i_2}, \ldots, f_{i_Q}$ (as shown above by Equation 8). In some other aspects, the beam training information 528 may indicate another signal strength value, which may be found by accumulating the measured signal strength values for the set of beam pairs that includes a respective one of the set of Q TX beams 512, f, paired with each of the set of K RX beams 414, $g_1, g_2, \ldots, g_K$ (as shown above by Equation 7).

The network entity 402 and the UE 404 may perform beam training 530 for the network entity 402 to calculate, find, or otherwise determine beam weights at the network entity 402. To do so, the UE 404 may sweep transmit a set of SRSs via at least one beam having beam weights associated with the covariance matrix estimated at the UE 404. The network entity 402 may sweep over some or all a set of beams (such as by using some or all of the set of L TX beams 412 or Q TX beams 512 as RX beams) to receive the SRSs transmitted by the UE 404.

Based on receiving the SRSs transmitted by the UE 404, the network entity 402 may measure a respective value indicative of signal strength or channel quality for each beam pair that includes a respective TX beam and the at least one RX beam. Accordingly, the network entity 402 may use the measured values to find at least one beamforming vector at the network entity, and the network entity 402 may configure at least one set of beam weights at the network entity according to the at least one beamforming vector. The at least one set of beamforming weights may be used at the side of the network entity 402 for beamformed communication with the UE 404.

Where the network entity includes a set of N antenna elements, the network entity 402 may calculate, find, or otherwise determine the network entity-side set of beam weights for communication with the UE 404 in 3N−2 sets of pilot signals (although a set may include only a single pilot signal). In combination with the number of sets of pilot signals with which the UE 404 may calculate, find, or otherwise determine the set of beam weights at the UE side, 3 M−2, the total number of sets of pilot signals to find the beam weights at both the network entity 402 and the UE 404 may be 3 M+3N−4, as shown above in Equation 4. As Equation 4 linearly grows in antenna dimensionality, the foregoing approach to finding suitable beams for communication between a network entity and a UE may incur less latency than some other approaches that quadratically grow in antenna dimensionality.

Figure 6:
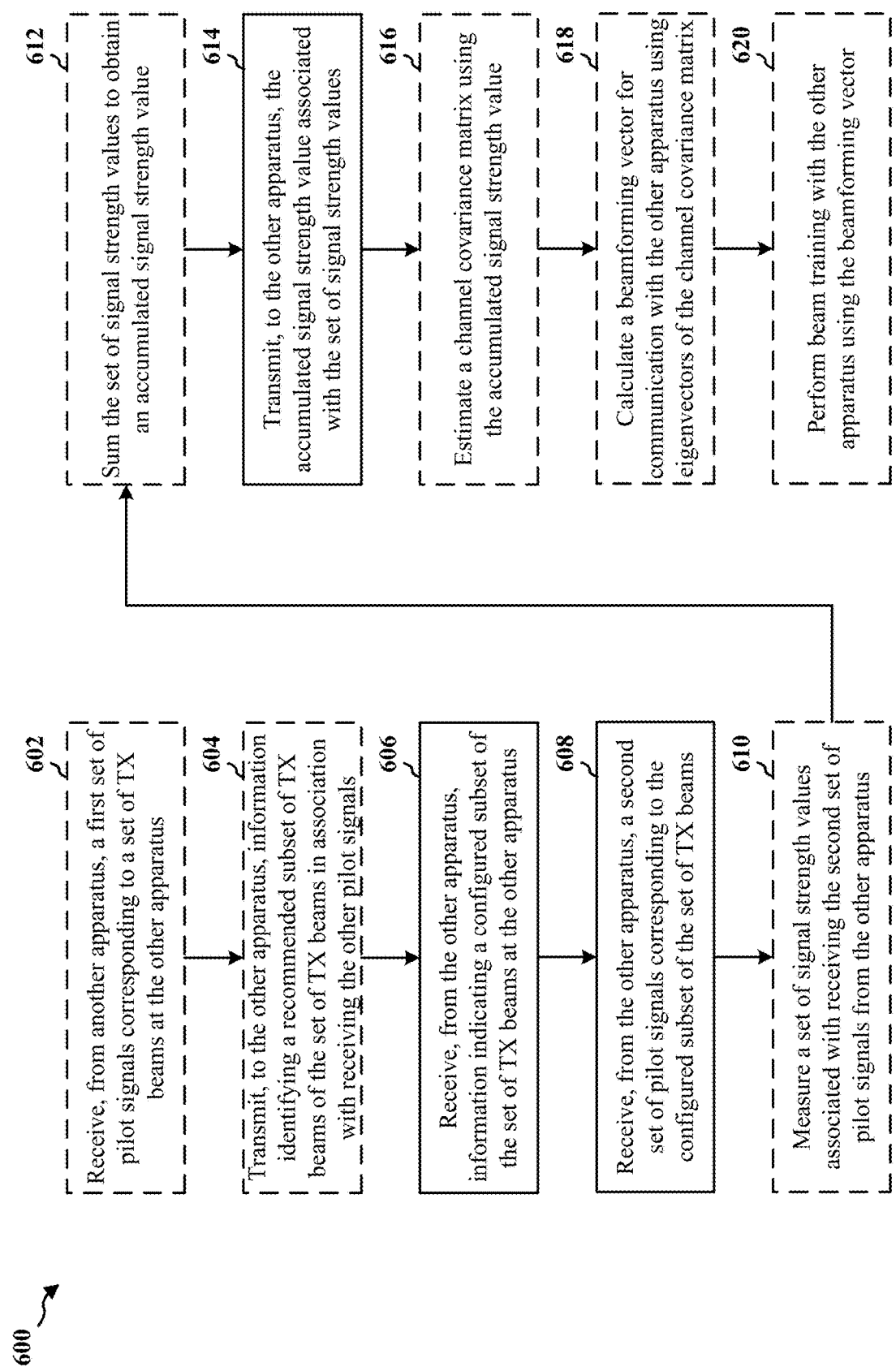
FIG. 6 shows a flowchart of an example method of wireless communication at a UE or an apparatus or a component thereof.

FIG. 6 shows a flowchart of an example method 600 of wireless communication. The method 600 may be performed by or at a UE (such as the UE 104, 350, 404), another wireless communications apparatus (such as the apparatus 802), or one or more components thereof. According to various different aspects, one or more of the illustrated blocks may be omitted, transposed, or contemporaneously performed.

At 602, the UE may receive, from another apparatus (such as a network entity), a first set of pilot signals corresponding to a set of TX beams at the other apparatus. According to various aspects, each of the first set of pilot signals may be an SSB, CSI-RS, DM-RS, another reference or synchronization signal, or any combination thereof. The first set of pilot signals may be transmitted via a set of L TX beams at the other apparatus, and the UE may receive the first set of pilot signals via a set of K RX beams at the UE.

Referring to FIGS. 4 and 5, for example, the UE 404 may receive, from the network entity 402, $burst_0$ 426a, $burst_1$ 426b, through $burst_{K-1}$ 426c, and each of the bursts 426a-426c may include a set of pilot signals corresponding to the set of L TX beams 412 at the network entity 402.

At 604, the UE may transmit, to the other apparatus, information identifying a recommended subset of TX beams of the set of TX beams in association with receiving the other pilot signals. For example, the UE may measure at least one value indicative of signal strength or channel quality for each beam pair that includes one of the set of TX beams and one of the set of RX beams, and the UE may identify P beam pairs having the highest or best measured values. Accordingly, the UE may transmit information recommending P TX beams of the P beam pairs to the other apparatus.

Referring to FIGS. 4 and 5, for example, the UE 404 may transmit, to the network entity 402, the P TX beams information 522 identifying a subset of P TX beams of the set of L TX beams 412 in association with receiving $burst_0$ 426a, $burst_1$ 426b, through $burst_{K-1}$ 426c from the network entity 402.

At 606, the UE may receive, from the other apparatus, information indicating a configured subset of the set of TX beams at the other apparatus. For example, the configured subset of the set of TX beams may include Q TX beams selected from the set of L TX beams. In some aspects, the configured subset of the set of TX beams may be associated with the recommended subset of the set of TX beams. For example, the configured subset of the set of TX beams may include one or more of the TX beams from the recommended subset of the set of TX beams (although not necessarily).

Referring to FIGS. 4 and 5, for example, the UE 404 may receive, from the network entity 402, the Q TX beams information 524 indicating the configured subset of Q TX beams 512 of the set of L TX beams 412 at the network entity 402.

At 608, the UE may receive, from the other apparatus, a second set of pilot signals corresponding to the configured subset of the set of TX beams. According to various aspects, each of the second set of pilot signals may be an SSB, CSI-RS, DM-RS, another reference or synchronization signal, or any combination thereof. The pilot signals of the second set may be of the same type as those of the first set (although not necessarily). The UE may receive the second set of pilot signals via each of the Q TX beams at the other apparatus paired with each of the K RX beams at the UE. The second set of pilot signals may be received using a different beam sweeping pattern than the first set of pilot signals (although not necessarily).

Referring to FIGS. 4 and 5, for example, the UE 404 may receive, from the network entity 402, $burst_0$ 526a, $burst_1$ 526b, through $burst_{K-1}$ 526c, and each of the bursts 526a-526c may include a set of pilot signals corresponding to the subset of Q TX beams 512 of the set of L TX beams 412 at the network entity 402.

At 610, the UE may measure a set of signal strength values associated with receiving the second set of pilot signals from the other apparatus. For example, the UE may use each of the set of K RX beams to monitor a respective set of resources expected to carry at least one of the set of pilot signals transmitted via each of the Q TX beams. For each of the set of pilot signals received via a respective beam pair that includes one of the Q TX beams paired with one of the K RX beams, the UE may detect the energy on the respective set of resources, and the UE may measure, detect, or otherwise determine the strength or quality of the at least one pilot signal carried on the respective set of resources. According to various aspects, the measured signal strength value may include at least one of an RSRP value associated with an L1 or an SS, an RSRQ value, an RSSI value, an SNR value, or an SINR value.

Referring to FIGS. 4 and 5, for example, the UE 404 may measure a set of signal strength values associated with receiving the pilot signals 540 included in the bursts 526a-526c for each of the set of K RX beams 414.

At 612, the UE may sum the set of signal strength values to obtain an accumulated signal strength value. For example, the UE may calculate an accumulated signal strength value for each of the K RX beams of the UE based on the measured values measured from the second set of pilot signals transmitted via each of the Q TX beams and received via a respective one of the set of RX beams of the UE. Each of the accumulated values may be found as a summation function of the measured values respectively measured over the Q TX beams when paired with a respective one of the set of RX beams. Accordingly, the UE may select each of the Q measured signal strength values corresponding to a respective one of the RX beams, and the UE may sum the Q measured signal strength values corresponding to the respective one of the RX beams, for example, according to Equation 8, shown above. The UE may repeat this procedure by selecting each of the K RX beams and summing the Q measured signal strength values corresponding to each of the K RX beams.

Referring to FIGS. 4 and 5, for example, the UE 404 may sum the set of signal strength values measured for a respective one of the set of K RX beams 414 paired with each of the Q TX beams 512 in order to obtain an accumulated signal strength value for the respective one of the set of K RX beams 414.

At 614, the UE may transmit, to the other apparatus, the accumulated signal strength value associated with the set of signal strength values. For example, the UE may transmit, to the other apparatus, information indicating accumulated signal strength values calculated for each of the K RX beams at the UE paired with each of the Q TX beams at the other apparatus.

Referring to FIGS. 4 and 5, for example, the UE 404 may transmit, to the network entity 402, the beam training information 528, which may indicate the accumulated signal strength values accumulated from signal strength values corresponding to each set of K RX beams 414 paired with each of the Q TX beams 512.

At 616, the UE may estimate a channel covariance matrix using the accumulated signal strength value. For example, the UE may generate a matrix data structure, and the UE may locate a respective position in the matrix data structure for each of the accumulated signal strength values. The UE may populate some or all of the entries of the matrix data structure with each of the accumulated signal strength values according to the respective positions located in the matrix data structure. The UE may use the populated matrix data structure to represent a covariance matrix at the UE side.

Referring to FIGS. 4 and 5, for example, the UE 404 may estimate a channel covariance matrix, R, as shown above in Equation 9 by populating a matrix with each of the accumulated signal strength values calculated according to Equation 8, shown above.

At 618, the UE may calculate a beamforming vector for communication with the other apparatus using eigenvectors of the channel covariance matrix. For example, the UE may calculate, estimate, or otherwise determine a set of eigenvectors included in the estimated channel covariance matrix, and the UE may identify a dominant eigenvector from the set of eigenvectors. The UE may select the dominant eigenvector, and may configure a beamforming vector according to the selected dominant eigenvector.

Referring to FIGS. 4 and 5, for example, the UE 404 may calculate a beamforming vector for communication with the network entity 402 using eigenvectors of the channel covariance matrix, R.

At 620, the UE may perform beam training with the other apparatus using the beamforming vector. For example, the UE may configure a set of beam weights for communication with the other apparatus based on the beamforming vector. The UE may transmit signals to the other apparatus using a beam generated according to the set of beam weights configured at the UE. In some aspects, the UE may transmits SRSs to the other apparatus, which the other apparatus may use for beam training.

Referring to FIGS. 4 and 5, for example, the UE 404 may perform beam training 530 with the network entity 402 using the beamforming vector. For example, the UE 404 may transmit a set of SRSs to the network entity 402 using a beam configured with beam weights associated with the beamforming vector.

Figure 7:
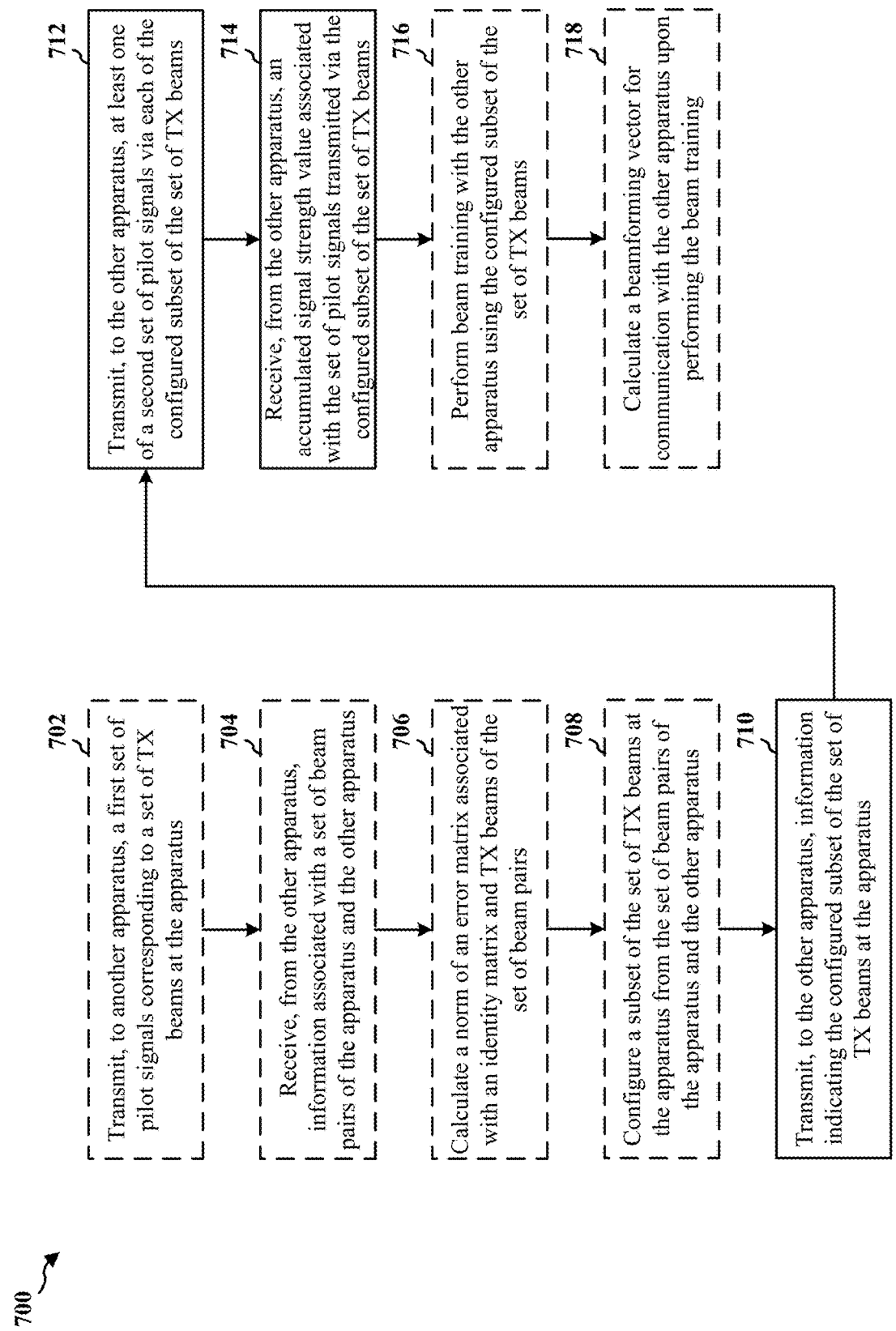
FIG. 7 shows a flowchart of an example method of wireless communication at a network entity or another apparatus or a component thereof.

FIG. 7 shows a flowchart of an example method 700 of wireless communication. The method may be performed by or at a network entity (such as a network entity 102/180 or a network entity 310, 402), another wireless communications apparatus (such as the apparatus 902), or one or more components thereof. According to various different aspects, one or more of the illustrated blocks may be omitted, transposed, or contemporaneously performed.

At 702, the apparatus may transmit, to another apparatus (such as a UE), a first set of pilot signals corresponding to a set of TX beams at the apparatus. According to various aspects, each of the first set of pilot signals may be an SSB, CSI-RS, DM-RS, another reference or synchronization signal, or any combination thereof. The first set of pilot signals may be transmitted via a set of L TX beams at the apparatus, and the other apparatus may receive the first set of pilot signals via a set of K RX beams at the other apparatus.

Referring to FIGS. 4 and 5, for example, the network entity 402 may transmit, to the UE 404, each of $burst_0$ 426a, $burst_1$ 426b, through $burst_{K-1}$ 426c via the set of L TX beams 412 at the network entity 402.

At 704, the apparatus may receive, from the other apparatus, information associated with a set of beam pairs of the apparatus and the other apparatus. In some aspects, the information may identify a recommended subset of P TX beams of the set of L TX beams. For example, the information may identify P beam pairs having the highest or best measured values measured from the first set of pilot signals.

Referring to FIGS. 4 and 5, for example, the network entity 402 may receive, from the UE 404, the P TX beams information 522 identifying a subset of P TX beams of the set of L TX beams 412 in association with transmitting $burst_0$ 426a, $burst_1$ 426b, through $burst_{K-1}$ 426c from the network entity 402.

At 706, the apparatus may calculate a norm of an error matrix associated with an identity matrix and TX beams of the set of beam pairs. In some aspects, the apparatus may be configured to select one or more subsets of Q TX beams, indexed as $i_1, \ldots, i_Q$, from the set of L TX beams. As shown above in Equation 6, the apparatus may calculate a sum over each of Q beamforming vectors of a subset of Q TX beams multiplied with a respective Hermitian. The apparatus may use some or all of the P TX beams indicated from the other apparatus (although not necessarily).

Further, the apparatus may calculate an error matrix by subtracting the calculated sum from an identity matrix, and the apparatus may calculate the norm of the error matrix. The apparatus may calculate multiple error matrices using different sets of Q beamforming vectors taken from the set of L TX beams, and the apparatus may find the respective norms of the multiple error matrices. According to various different aspects, the apparatus may calculate any one of a number of various norms that can be found from a matrix, such as the 2-norm, Frobenius norm, L-infinity norm, or another norm.

Referring to FIGS. 4 and 5, for example, the network entity 402 may calculate a norm of an error matrix associated with an identity matrix I and Q TX beams of the set of L TX beams 412. The network entity 402 may select some or all of the Q TX beams for calculation of the norm associated with P TX beams indicated in the P TX beams information 522 received from the UE 404.

At 708, the apparatus may configure a subset of the set of TX beams at the apparatus from the set of beam pairs of the apparatus and the other apparatus. For example, the apparatus may compare norms calculated from multiple error matrices for multiple different sets of Q TX beams. In association with the comparison, the apparatus may find the minimized norm, given the subsets of Q TX beams for which the apparatus calculated the norms. Relative to other norms calculated by the apparatus, the apparatus may select the comparatively lowest norm as the minimized norm. The apparatus may estimate the set of Q TX beams, $f_{i_1}$, $f_{i_2}$, ..., $f_{i_Q}$, corresponding to the minimized norm includes an approximation of orthogonal beams from which the other apparatus can estimate a covariance matrix, and ultimately, calculate beam weights for communication with the apparatus.

Referring to FIGS. 4 and 5, for example, the network entity 402 may configure a subset of Q TX beams 512 of the set of L TX beams 412 at the network entity 402 from the set of beam pairs of the apparatus and the other apparatus.

At 710, the apparatus may transmit, to the other apparatus, information indicating the configured subset of the set of TX beams at the apparatus. For example, the configured subset of the set of TX beams may include Q TX beams selected from the set of L TX beams at the apparatus. In some aspects, the configured subset of the set of TX beams may be associated with the recommended subset of the set of TX beams. For example, the configured subset of the set of TX beams may include one or more of the TX beams from the recommended subset of the set of TX beams (although not necessarily).

Referring to FIGS. 4 and 5, for example, the network entity 402 may transmit, to the UE 404, the Q TX beams information 524 indicating the configured subset of Q TX beams 512 of the set of L TX beams 412 at the network entity 402.

At 712, the apparatus may transmit, to the other apparatus, at least one of a second set of pilot signals via each of the configured subset of the set of TX beams. According to various aspects, each of the second set of pilot signals may be an SSB, CSI-RS, DM-RS, another reference or synchronization signal, or any combination thereof. The pilot signals of the second set may be of the same type as those of the first set (although not necessarily). The second set of pilot signals may be transmitted using a different beam sweeping pattern than the first set of pilot signals (although not necessarily).

Referring to FIGS. 4 and 5, for example, the network entity 402 may transmit, to the UE 404, burst$_0$ 526a, burst$_1$ 526b, through burst$_{K-1}$ 526c, and each of the bursts 526a-526c may include a set of pilot signals corresponding to the subset of Q TX beams 512 of the set of L TX beams 412 at the network entity 402.

At 714, the apparatus may receive, from the other apparatus, an accumulated signal strength value associated with the set of pilot signals transmitted via the configured subset of the set of TX beams. For example, the accumulated signal strength value may include an accumulated signal strength value calculated for one of the K RX beams at the other apparatus paired with each of the Q TX beams at the apparatus. In some aspects, the apparatus may receive multiple accumulated signal strength values respectively calculated for each of the K RX beams at the other apparatus paired with each of the Q TX beams at the apparatus.

Referring to FIGS. 4 and 5, for example, the network entity 402 may receive, from the UE 404, the beam training information 528, which may indicate the accumulated signal strength values accumulated from signal strength values corresponding to each set of K RX beams 414 paired with each of the Q TX beams 512.

At 716, the apparatus may perform beam training with the other apparatus using the configured subset of the set of TX beams. For example, the apparatus may receive a set of SRSs transmitted by the other apparatus via at least one beam that is generated using beam weights determined based on a channel covariance matrix that is estimated in association with transmitting the second set of pilot signals to the other apparatus via the set of Q TX beams. The apparatus may measure a set of signal strength values associated with receiving the SRSs from the other apparatus.

Referring to FIGS. 4 and 5, for example, the network entity 402 may perform beam training 530 with the UE 404 using the configured Q TX beams 512. For example, the network entity 402 may receive a set of SRSs from the UE 404 using a beam configured from the set of Q TX beams 512 (although used as an RX beam here).

At 718, the apparatus may calculate a beamforming for communication with the other apparatus upon performing the beam training. For example, the apparatus may sum a subset of the set of signal strength values corresponding to a respective one of the beams at the apparatus via which at least one of the SRSs is received paired with each of the beams at the other apparatus via which at least one of the SRSs is transmitted using the accumulated signal strength value. The apparatus may combine accumulated signal strength values corresponding to each of the beams via which at least one SRS is received (e.g., the Q TX beams) in a matrix data structure, which may represent the channel covariance matrix, R, at the side of the apparatus. Based on the matrix data structure used to represent R, the apparatus may calculate a beamforming vector for communication with the other apparatus using eigenvectors of the channel covariance matrix. For example, the apparatus may identify a dominant eigenvector from the set of eigenvectors, and the apparatus may configure a beamforming vector according to the identified dominant eigenvector.

Referring to FIGS. 4 and 5, for example, the network entity 402 may calculate a beamforming vector for communication with the UE 404 upon performing the beam training 530.

Figure 8:
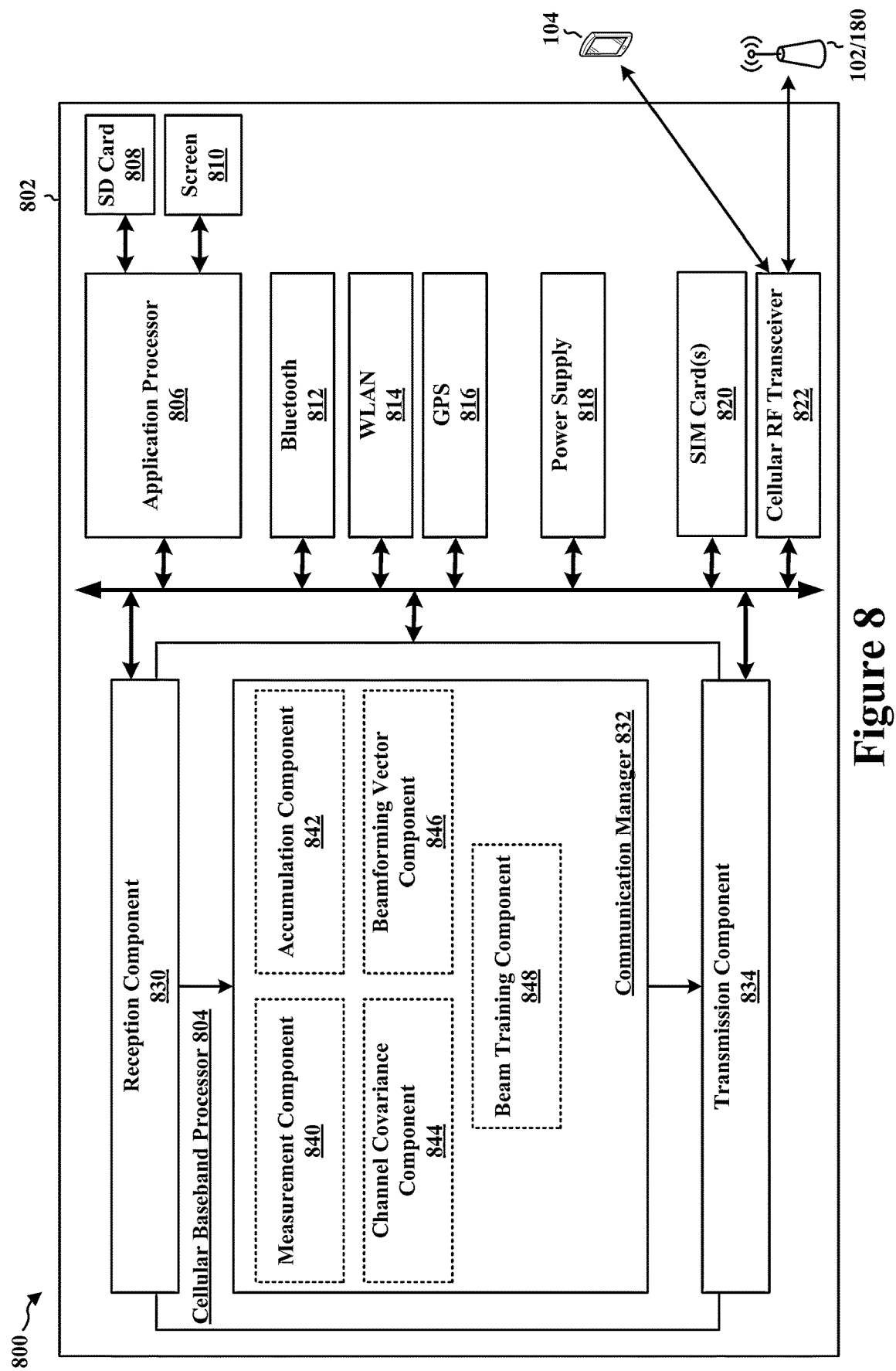
FIG. 8 shows a diagram of an example hardware implementation for an apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem or a processing system) and a cellular RF transceiver 822, which may be coupled together or integrated into the same package, component, circuit, chip, or other circuitry.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification or authentication information, such as an international mobile subscriber identity (IMSI) or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and a power supply 818.

The cellular baseband processor 804 communicates through the cellular RF transceiver 822 with the UE 104 or the network entity 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described herein. The computer-readable medium/memory may also be used for storing data that is manipulated by the cellular baseband processor 804 when executing software.

In the context of FIG. 3, the cellular baseband processor 804 may be a component of the UE 350 and may include the memory 360 or at least one of the TX processor 368, the RX processor 356, or the controller/processor 359. In one configuration, the apparatus 802 may be a modem chip or may be implemented as the baseband processor 804, while in another configuration, the apparatus 802 may be the entire UE (such as the UE 350 of FIG. 3) and may include some or all of the abovementioned components, circuits, chips, or other circuitry illustrated in the context of the apparatus 802. In one configuration, the cellular RF transceiver 822 may be implemented as at least one of the transmitter 354TX or the receiver 354RX.

The cellular baseband processor 804 may include a communication manager 832, and further, may include or may be connected with a reception component 830 and a transmission component 834. The reception component 830 and the transmission component 834 may be separately implemented or may be at least partially implemented in one component, such as a transceiver component. Each of the reception component 830, the communication manager 832, and the transmission component 834 may be implemented in hardware, software, firmware, or any combination thereof.

The reception component 830 may function as an interface for signaling into the cellular baseband processor 804 or the communication manager 832. For example, the reception component 830 may be an interface of a processor or a processing system and may provide some or all data or control information included in received signaling to the communication manager 832. The transmission component 834 may function as an interface for signaling out of the cellular baseband processor 804 or the communication manager 832. For example, the transmission component 834 may be an interface of a processor or a processing system and may provide some or all data or control information to be included in signaling to the cellular RF transceiver 822 from the communication manager 832. Further, the communication manager 832 may generate and provide some or all of the data or control information to be included in transmitted signaling to the transmission component 834.

The communication manager 832 may include the various illustrated components, including one or more components configured to process received data or control information, or one or more components configured to generate data or control information for transmission. For example, the communication manager 832 may include a measurement component 840, an accumulation component 842, a channel covariance component 844, a beamforming vector component 846, and a beam training component 848. The components within the communication manager 832 may be stored in computer-readable medium/memory or configured as hardware within the cellular baseband processor 804.

The reception component 830 may be configured to obtain or receive, from the network entity 102/180 (or other network entity), a first set of pilot signals corresponding to a set of TX beams at the network entity 102/180, for example, as described in connection with 602 of FIG. 6. According to various aspects, each of the first set of pilot signals may be an SSB, CSI-RS, DM-RS, another reference or synchronization signal, or any combination thereof. The first set of pilot signals may be transmitted via a set of L TX beams at the network entity 102/180, and the reception component 830 may obtain or receive the first set of pilot signals via a set of K RX beams at the apparatus 802.

The transmission component 834 may output or transmit, to the network entity 102/180, information identifying a recommended subset of TX beams of the set of TX beams in association with obtaining or receiving the other pilot signals, for example, as described in connection with 604 of FIG. 6. For example, the measurement component 840 may measure at least one value indicative of signal strength or channel quality for each beam pair that includes one of the set of TX beams and one of the set of RX beams, and the measurement component 840 may identify P beam pairs having the highest or best measured values. Accordingly, the transmission component 834 may output or transmit information recommending P TX beams of the P beam pairs to the network entity 102/180.

The reception component 830 may obtain or receive, from the network entity 102/180, information indicating a configured subset of the set of TX beams at the network entity 102/180, for example, as described in connection with 606 of FIG. 6. For example, the configured subset of the set of TX beams may include Q TX beams selected from the set of L TX beams. In some aspects, the configured subset of the set of TX beams may be associated with the recommended subset of the set of TX beams. For example, the configured subset of the set of TX beams may include one or more of the TX beams from the recommended subset of the set of TX beams (although not necessarily).

The reception component 830 may obtain or receive, from the network entity 102/180, a second set of pilot signals corresponding to the configured subset of the set of TX beams, for example, as described in connection with 608 of FIG. 6. According to various aspects, each of the second set of pilot signals may be an SSB, CSI-RS, DM-RS, another reference or synchronization signal, or any combination thereof. The pilot signals of the second set may be of the same type as those of the first set (although not necessarily). The reception component 830 may obtain or receive the second set of pilot signals via each of the Q TX beams at the network entity 102/180 paired with each of the K RX beams at the apparatus 802. The second set of pilot signals may be obtained or received using a different beam sweeping pattern than the first set of pilot signals (although not necessarily).

The measurement component 840 may measure a set of signal strength values associated with obtaining or receiving the second set of pilot signals from the network entity 102/180, for example, as described in connection with 610 of FIG. 6. For example, the reception component 830 may use each of the set of K RX beams to monitor a respective set of resources expected to carry at least one of the set of pilot signals output or transmitted via each of the Q TX beams. For each of the set of pilot signals obtained or received via a respective beam pair that includes one of the Q TX beams paired with one of the K RX beams, the measurement component 840 may detect the energy on the respective set of resources, and the measurement component 840 may measure, detect, or otherwise determine the strength or quality of the at least one pilot signal carried on the respective set of resources. According to various aspects, the measured signal strength value may include at least one of an RSRP value associated with an L1 or a an SS, an RSRQ value, an RSSI value, an SNR value, or an SINR value.

The accumulation component 842 may sum the set of signal strength values to obtain an accumulated signal strength value, for example, as described in connection with 612 of FIG. 6. For example, the accumulation component 842 may calculate an accumulated signal strength value for each of the K RX beams of the component based on the measured values measured from the second set of pilot signals output or transmitted via each of the Q TX beams and obtained or received via a respective one of the set of RX beams of the apparatus 802. Each of the accumulated values may be found as a summation function of the measured values respectively measured over the Q TX beams when paired with a respective one of the set of RX beams. Accordingly, the accumulation component 842 may select each of the Q measured signal strength values corresponding to a respective one of the RX beams, and the accumulation component 842 may sum the Q measured signal strength values corresponding to the respective one of the RX beams, for example, according to Equation 8, shown above. The accumulation component 842 may repeat this procedure by selecting each of the K RX beams and summing the Q measured signal strength values corresponding to each of the K RX beams.

The transmission component 834 may output or transmit, to the network entity 102/180, the accumulated signal strength value associated with the set of signal strength values, for example, as described in connection with 614 of FIG. 6. For example, the transmission component 834 may output or transmit, to the network entity 102/180, information indicating accumulated signal strength values calculated for each of the K RX beams at the apparatus 802 paired with each of the Q TX beams at the network entity 102/180.

The channel covariance component 844 may estimate a channel covariance matrix using the accumulated signal strength values, for example, as described in connection with 616 of FIG. 6. For example, the channel covariance component 844 may generate a matrix data structure, and the channel covariance component 844 may locate a respective position in the matrix data structure for each of the accumulated signal strength values. The channel covariance component 844 may populate some or all of the entries of the matrix data structure with each of the accumulated signal strength values according to the respective positions located in the matrix data structure. The channel covariance component 844 may use the populated matrix data structure to represent a covariance matrix at the component side.

The beamforming vector component 846 may calculate a beamforming vector for communication with the network entity 102/180 using eigenvectors of the channel covariance matrix. For example, the beamforming vector component 846 may calculate, estimate, or otherwise determine a set of eigenvectors included in the estimated channel covariance matrix, and the beamforming vector component 846 may identify a dominant eigenvector from the set of eigenvectors. The beamforming vector component 846 may select the dominant eigenvector, and may configure a beamforming vector according to the selected dominant eigenvector.

The beam training component 848 may perform beam training with the network entity 102/180 using the beamforming vector, for example, as described in connection with 620 of FIG. 6. For example, the beam training component 848 may configure a set of beam weights for communication with the network entity 102/180 based on the beamforming vector. The beam training component 848 may cause the transmission component 834 to output or transmit signals to the network entity 102/180 using a beam generated according to the set of beam weights configured at the apparatus 802. In some aspects, the beam training component 848 may cause the transmission component 834 to output or transmit SRSs to the network entity 102/180, which the network entity 102/180 may use for beam training.

The apparatus 802 may include additional components that perform some or all of the blocks, operations, signaling, etc. of the algorithms in the aforementioned call flow diagrams or flowcharts of FIG. 4-6. As such, some or all of the blocks, operations, signaling, etc. in the aforementioned call flow diagrams or flowcharts of FIGS. 4-6 may be performed by one or more components and the apparatus 802 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a network entity 102/180, information indicating a configured subset of a set of TX beams at the network entity 102/180; means for receiving, from the network entity 102/180, pilot signals corresponding to the configured subset of the set of TX beams, each of a set of signal strength values being associated with receiving at least one of the pilot signals; and means for transmitting, to the network entity 102/180, an accumulated signal strength value associated with the set of signal strength values.

In one configuration, the apparatus 802, and in particular the cellular baseband processor 804, may further include means for measuring the set of signal strength values associated with receiving the pilot signals from the network entity 102/180.

In one configuration, the information indicating the configured subset of the set of TX beams at the network entity 102/180 can be included in a SIB, a pilot signal, or another broadcast transmission from the network entity 102/180.

In one configuration, the apparatus 802, and in particular the cellular baseband processor 804, may further include means for summing the set of signal strength values to obtain the accumulated signal strength value.

In one configuration, the apparatus 802, and in particular the cellular baseband processor 804, may further include means for receiving, from the network entity 102/180, other pilot signals corresponding to the configured subset of the set of TX beams, and each of at least one other set of signal strength values may be associated with receiving at least one of the other pilot signals from the network entity 102/180, and the accumulated signal strength value can further be associated with the at least one other set of signal strength values.

In one configuration, each of the pilot signals can be received via a RX beam of the apparatus 802, and each of the other pilot signals can be received via at least one other RX beam of the apparatus 802.

In one configuration, the apparatus 802, and in particular the cellular baseband processor 804, may further include means for receiving other pilot signals from the network entity 102/180, and the other pilot signals can correspond to the set of TX beams at the network entity 102/180; and means for transmitting, to the network entity 102/180, information identifying a recommended subset of TX beams of the set of TX beams in association with receiving the other pilot signals, and the configured subset of the set of TX beams may be associated with the recommended subset of the set of TX beams.

In one configuration, the apparatus 802, and in particular the cellular baseband processor 804, may further include means for estimating a channel covariance matrix using the accumulated signal strength value; and means for calculating a beamforming vector for communication with the network entity 102/180 using eigenvectors of the channel covariance matrix.

In one configuration, the apparatus 802, and in particular the cellular baseband processor 804, may further include means for performing beam training with the network entity 102/180 using the beamforming vector.

In one configuration, each of the pilot signals can include an SSB or a CSI-RS.

In one configuration, each of the set of signal strength values can include an RSRP value associated with L1 or an SS, an RSRQ value, an RSSI value, an SNR value, or an SINR value.

The aforementioned means may be one or more of the aforementioned components of the apparatus 802 configured to perform the functions recited by the aforementioned means. As described herein, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
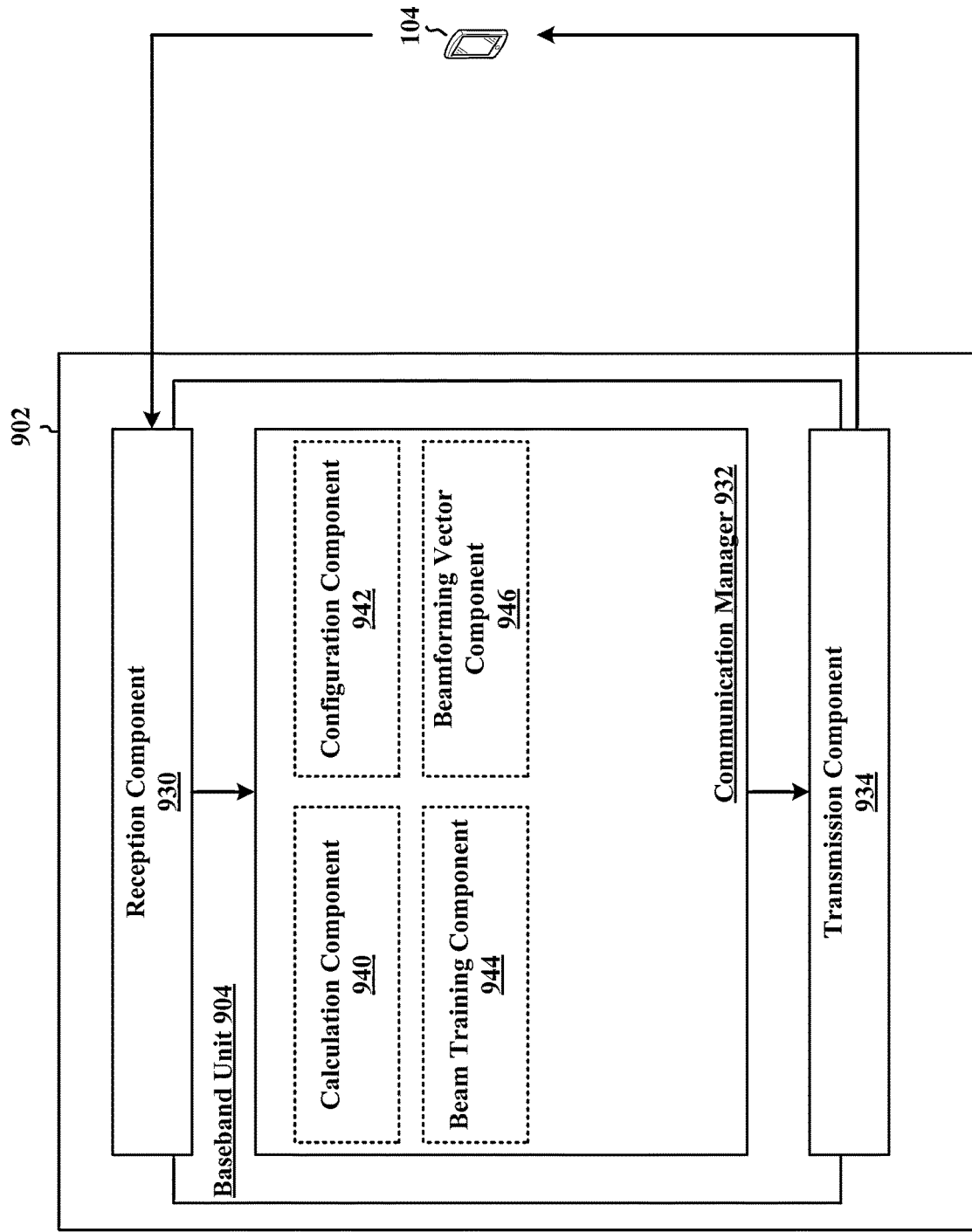
FIG. 9 shows a diagram of another example hardware implementation for another apparatus.

FIG. 9 is a diagram 900 illustrating an example of a hardware implementation for an apparatus 902. The apparatus 902 may be a network entity or similar device or system, or the apparatus 902 may be a component of a network entity or similar device or system. The apparatus 902 may include a baseband unit 904, which may be implemented as or included in a processing system, in some aspects. The baseband unit 904 may communicate through a cellular RF transceiver. For example, the baseband unit 904 may communicate through a cellular RF transceiver with a UE 104, such as for downlink or uplink communication, or with a network entity 102/180, such as for IAB.

The baseband unit 904 may include a computer-readable medium/memory, which may be non-transitory. The baseband unit 904 is responsible for general processing, including the execution of software stored on the computer-readable medium/memory. The software, when executed by the baseband unit 904, causes the baseband unit 904 to perform the various functions described herein. The computer-readable medium/memory may also be used for storing data that is manipulated by the baseband unit 904 when executing software.

The baseband unit 904 may include a communication manager 932, and further, may include or may be connected with a reception component 930 and a transmission component 934. The reception component 930 and the transmission component 934 may be separately implemented or may be at least partially implemented in one component, such as a transceiver component. Each of the reception component 930, the communication manager 932, and the transmission component 934 may be implemented in hardware, software, firmware, or any combination thereof.

The reception component 930 may function as an interface for signaling into the baseband unit 904 or the communication manager 932. For example, the reception component 930 may be an interface of a processor or a processing system and may provide some or all data or control information included in received signaling to the communication manager 932. The transmission component 934 may function as an interface for signaling out of the baseband unit 904 or the communication manager 932. For example, the transmission component 934 may be an interface of a processor or a processing system and may provide some or all data or control information to be included in signaling from the communication manager 932. Further, the communication manager 832 may generate and provide some or all of the data or control information to be included in transmitted signaling to the transmission component 934.

The communication manager 932 includes the one or more illustrated components. The components within the communication manager 932 may be stored in the computer-readable medium/memory or configured as hardware within the baseband unit 904. The baseband unit 904 may be a component of the network entity 310 and may include the memory 376 or at least one of the TX processor 316, the RX processor 370, and the controller/processor 375.

The reception component 930 may be configured to receive signaling on a wireless channel, such as signaling from a UE 104 or network entity 102/180. The transmission component 934 may be configured to transmit signaling on a wireless channel, such as signaling to a UE 104 or network entity 102/180. The communication manager 932 may coordinate or manage some or all wireless communications by the apparatus 902, including across the reception component 930 and the transmission component 934.

The reception component 930 may provide some or all data or control information included in received signaling to the communication manager 932, and the communication manager 932 may generate and provide some or all of the data or control information to be included in transmitted signaling to the transmission component 934. The communication manager 932 may include the various illustrated components, including one or more components configured to process received data or control information, or one or more components configured to generate data or control information for transmission. In some aspects, the generation of data or control information may include packetizing or otherwise reformatting data or control information received from a core network, such as the core network 190 or the EPC 160, for transmission.

The transmission component 934 may be configured to output or transmit, to the UE 104, a first set of pilot signals corresponding to a set of TX beams at the apparatus 902, for example, as described in connection with 702 of FIG. 7. According to various aspects, each of the first set of pilot signals may be an SSB, CSI-RS, DM-RS, another reference or synchronization signal, or any combination thereof. The first set of pilot signals may be output or transmitted via a set of L TX beams at the apparatus 902, and the UE 104 may receive the first set of pilot signals via a set of K RX beams at the UE 104.

The reception component 930 may be configured to obtain or receive, from the UE 104, information associated with a set of beam pairs of the apparatus 902 and the UE 104, for example, as described in connection with 704 of FIG. 7. In some aspects, the information may identify a recommended subset of P TX beams of the set of L TX beams. For example, the information may identify P beam pairs having the highest or best measured values measured from the first set of pilot signals.

The calculation component 940 may be configured to calculate a norm of an error matrix associated with an identity matrix and TX beams of the set of beam pairs, for example, as described in connection with 706 of FIG. 7. In some aspects, the calculation component 940 may be configured to select one or more subsets of Q TX beams, indexed as $i_1, \ldots, i_Q$, from the set of L TX beams. As shown above in Equation 6, the calculation component 940 may calculate a sum over each of Q beamforming vectors of a subset of Q TX beams multiplied with a respective Hermitian. The calculation component 940 may use some or all of the P TX beams indicated from the UE 104 (although not necessarily).

Further, the calculation component 940 may calculate an error matrix by subtracting the calculated sum from an identity matrix, and the calculation component 940 may calculate the norm of the error matrix. The calculation component 940 may calculate multiple error matrices using different sets of Q beamforming vectors taken from the set of L TX beams, and the calculation component 940 may find the respective norms of the multiple error matrices. According to various different aspects, the calculation component 940 may calculate any one of a number of various norms that can be found from a matrix, such as the 2-norm, Frobenius norm, L-infinity norm, or another norm.

The configuration component 942 may configure a subset of the set of TX beams at the apparatus 902 using information indicating the set of beam pairs of the apparatus 902 and the UE 104, for example, as described in connection with 708 of FIG. 7. For example, the configuration component 942 may compare norms calculated from multiple error matrices for multiple different sets of Q TX beams. In association with the comparison, the configuration component 942 may find the minimized norm, given the subsets of Q TX beams for which the calculation component 940 calculated the norms. Relative to other norms calculated by the calculation component 940, the configuration component 942 may select the comparatively lowest norm as the minimized norm. The configuration component 942 may estimate the set of Q TX beams, $f_{i_1}, f_{i_2}, \ldots, f_{i_Q}$, corresponding to the minimized norm includes an approximation of orthogonal beams from which the UE 104 can estimate a covariance matrix, and ultimately, calculate beam weights for communication with the apparatus 902.

The transmission component 934 may be configured to output or transmit, to the UE 104, information indicating the configured subset of the set of TX beams at the apparatus 902, for example, as described in connection with 710 of FIG. 7. For example, the configured subset of the set of TX beams may include Q TX beams selected from the set of L TX beams at the apparatus 902. In some aspects, the configured subset of the set of TX beams may be associated with the recommended subset of the set of TX beams. For example, the configured subset of the set of TX beams may include one or more of the TX beams from the recommended subset of the set of TX beams (although not necessarily).

The transmission component 934 may be further configured to output or transmit, to the UE 104, at least one of a second set of pilot signals via each of the configured subset of the set of TX beams, for example, as described in connection with 712 of FIG. 7. According to various aspects, each of the second set of pilot signals may be an SSB, CSI-RS, DM-RS, another reference or synchronization signal, or any combination thereof. The pilot signals of the second set may be of the same type as those of the first set (although not necessarily). The second set of pilot signals may be output or transmitted using a different beam sweeping pattern than the first set of pilot signals (although not necessarily).

The reception component 930 may be further configured to obtain or receive, from the UE 104, an accumulated signal strength value associated with the set of pilot signals output or transmitted via the configured subset of the set of TX beams, for example, as described in connection with 714 of FIG. 7. For example, the accumulated signal strength value may include an accumulated signal strength value calculated for one of the K RX beams at the UE 104 paired with each of the Q TX beams at the apparatus 902. In some aspects, the reception component 930 may obtain or receive multiple accumulated signal strength values respectively calculated for each of the K RX beams at the UE 104 paired with each of the Q TX beams at the apparatus 902.

The beam training component 944 may be configured to perform beam training with the UE 104 using the configured subset of the set of TX beams, for example, as described in connection with 716 of FIG. 7. For example, the reception component 930 may obtain or receive a set of SRSs transmitted by the UE 104 via at least one beam that is generated using beam weights calculated, found, or otherwise determined based on a channel covariance matrix that is estimated in association with outputting or transmitting the second set of pilot signals to the UE 104 via the set of Q TX beams. The beam training component 944 may measure a set of signal strength values associated with obtaining or receiving the SRSs from the UE 104.

The beamforming vector component 946 may calculate a beamforming vector for communication with the UE 104 upon performing the beam training, for example, as described in connection with 718 of FIG. 7. For example, the beamforming vector component 946 may sum a subset of the set of signal strength values corresponding to a respective one of the beams at the apparatus 902 via which at least one of the SRSs is obtained or received paired with each of the beams at the UE 104 via which at least one of the SRSs is transmitted. The beamforming vector component 946 may combine accumulated signal strength values corresponding to each of the beams via which at least one SRS is obtained or received (e.g., the Q TX beams, which may also be used as RX beams) in a matrix data structure. The matrix data structure may represent the channel covariance matrix, R, at the side of the apparatus 902. In association with the matrix data structure used to represent R, the beamforming vector component 946 may calculate a beamforming vector for communication with the UE 104 using eigenvectors of the channel covariance matrix, R. For example, the beamforming vector component 946 may identify a dominant eigenvector from the set of eigenvectors, and the beamforming vector component 946 may configure a beamforming vector according to the identified dominant eigenvector.

The apparatus 902 may include additional components that perform some or all of the blocks, operations, signaling, etc. of the algorithms in the aforementioned call flow diagrams or flowcharts of FIG. 4, 5, or 7. As such, some or all of the blocks, operations, signaling, etc. in the aforementioned call flow diagrams or flowcharts of FIG. 4, 5, or 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE 104, information indicating a configured subset of a set of TX beams at the apparatus 902; means for transmitting, to the UE 104, one of a set of pilot signals via each TX beam of the configured subset of the set of TX beams; and means for receiving, from the UE 104, an accumulated signal strength value associated with the set of pilot signals transmitted via the configured subset of the set of TX beams.

In one configuration, the information indicating the subset of the set of TX beams at the apparatus 902 can be included in a SIB, a pilot signal, or another broadcast transmission from the UE 104.

In one configuration, the apparatus 902, and in particular the baseband unit 904, may further include means for transmitting, to the UE 104, one of another set of pilot signals via each TX beam of the subset of the set of TX beams, and the accumulated signal strength value can be further associated with the other set of pilot signals transmitted via the subset of the set of TX beams.

In one configuration, the apparatus 902, and in particular the baseband unit 904, may further include means for transmitting, to the UE 104, another set of pilot signals via the set of TX beams; means for receiving, from the UE 104, information associated with a set of beam pairs of the apparatus 902 and the UE 104; and means for configuring the configured subset of the set of TX beams at the apparatus 902 from the set of beam pairs of the apparatus 902 and the UE 104.

In one configuration, the apparatus 902, and in particular the baseband unit 904, may further include means for calculating a norm of an error matrix associated with an identity matrix and TX beams of the set of beam pairs of the apparatus 902 and the UE 104, and the subset of the set of TX beams can be configured from comparison of the norm with a threshold.

In one configuration, the apparatus 902, and in particular the baseband unit 904, may further include means for performing beam training with the UE 104 using the configured subset of the set of TX beams; and means for calculating a beamforming vector for communication with the UE 104 upon performing the beam training.

In one configuration, each of the pilot signals can include an SSB or a CSI-RS.

In one configuration, the accumulated signal strength value can include an RSRP value associated with L1 or an SS value, an RSRQ value, an RSSI value, an SNR value, or an SINR value.

The aforementioned means may be one or more of the aforementioned components of the apparatus 902 configured to perform the functions recited by the aforementioned means. As described herein, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each the processes, flowcharts, and other diagrams may be rearranged, omitted, or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other implementations, concepts, or various aspects described herein, without limitation.

Example 1 may be an apparatus for wireless communication, including a processing system configured to: obtain, through a first interface, information obtained from another apparatus indicating a configured subset of a set of TX beams at the other apparatus, and obtain, through the first interface, pilot signals obtained from the other apparatus corresponding to the configured subset of the set of TX beams, each of a set of signal strength values being associated with obtaining at least one of the pilot signals; and a second interface connected to the processing system and configured to output, to the other apparatus, an accumulated signal strength value associated with the set of signal strength values.

Example 2 may include the apparatus of Example 1, and the processing system may be further configured to: measure the set of signal strength values associated with obtaining the pilot signals from the other apparatus.

Example 3 may include the apparatus of Example 1, and the information indicating the configured subset of the set of TX beams at the other apparatus can be included in a SIB, a pilot signal, or another broadcast transmission from the other apparatus.

Example 4 may include the apparatus of Example 1, and the processing system may be further configured to: sum the set of signal strength values to obtain the accumulated signal strength value.

Example 5 may include the apparatus of Example 1, and the processing system may be further configured to: obtain, through the first interface, other pilot signals obtained from the other apparatus corresponding to the configured subset of the set of TX beams, and each of at least one other set of signal strength values can be associated with obtaining at least one of the other pilot signals from the other apparatus, and the accumulated signal strength value can be further associated with the at least one other set of signal strength values.

Example 6 may include the apparatus of Example 5, and each of the pilot signals can be obtained via an RX beam of the apparatus, and each of the other pilot signals can be obtained via at least one other RX beam of the apparatus.

Example 7 may include the apparatus of Example 1, and the processing system may be further configured to: obtain, through the first interface, other pilot signals from the other apparatus, the other pilot signals corresponding to the set of TX beams at the other apparatus; and the second interface is further configured to output, to the other apparatus, information identifying a recommended subset of TX beams of the set of TX beams in association with obtaining the other pilot signals, and the configured subset of the set of TX beams can be based on the recommended subset of the set of TX beams.

Example 8 may include the apparatus of Example 1, and the processing system may be further configured to: estimate a channel covariance matrix using the accumulated signal strength value; and calculate a beamforming vector for communication with the other apparatus using eigenvectors of the channel covariance matrix.

Example 9 may include the apparatus of Example 8, and the processing system may be further configured to: perform beam training with the other apparatus using the beamforming vector.

Example 10 may include the apparatus of Example 1, and each of the pilot signals can include an SSB or a CSI-RS.

Example 11 may include the apparatus of Example 1, and each of the set of signal strength values can include an RSRP value associated with L1 or an SS, an RSRQ value, an RSSI value, an SNR value, or an SINR value.

Example 12 may be an apparatus for wireless communication, including a first interface connected to a processing system and configured to: output, to another apparatus, information indicating a configured subset of a set of TX beams at the apparatus, and output, to the other apparatus, one of a set of pilot signals via each TX beam of the configured subset of the set of TX beams; and the processing system configured to obtain, through a second interface, an accumulated signal strength value obtained from the other apparatus associated with the set of pilot signals output via the configured subset of the set of TX beams.

Example 13 may include the apparatus of Example 12, and the information indicating the subset of the set of TX beams at the apparatus can be included in a SIB, a pilot signal, or another broadcast transmission.

Example 14 may include the apparatus of Example 12, and the first interface may be further configured to: output, to the other apparatus, one of another set of pilot signals via each TX beam of the subset of the set of TX beams, and the accumulated signal strength value can be further associated with the other set of pilot signals output via the subset of the set of TX beams.

Example 15 may include the apparatus of Example 12, and the first interface may be further configured to output, to the other apparatus, another set of pilot signals via the set of TX beams; the second interface may be further configured to obtain, from the other apparatus, information associated with a set of beam pairs of the apparatus and the other apparatus; and the processing system may be further configured to configure the configured subset of the set of TX beams at the apparatus from the set of beam pairs of the apparatus and the other apparatus.

Example 16 may include the apparatus of Example 15, and the processing system may be further configured to calculate a norm of an error matrix associated with an identity matrix and TX beams of the set of beam pairs of the apparatus and the other apparatus, and the subset of the set of TX beams can be configured from comparison of the norm with a threshold.

Example 17 may include the apparatus of Example 12, and the processing system may be further configured to: perform beam training with the other apparatus using the configured subset of the set of TX beams; and calculate a beamforming vector for communication with the other apparatus upon performance of the beam training.

Example 18 may include the apparatus of Example 12, and each of the pilot signals can include an SSB or a CSI-RS.

Example 19 may include the apparatus of Example 12, and the accumulated signal strength value can include an RSRP value associated with L1 or a SS value, an RSRQ value, an RSSI value, an SNR value, or an SINR value.

Example 20 may be a method for wireless communication at an apparatus, including: receiving, from another apparatus, information indicating a configured subset of a set of TX beams at the other apparatus; receiving, from the other apparatus, pilot signals corresponding to the configured subset of the set of TX beams, each of a set of signal strength values being associated with receiving at least one of the pilot signals; and transmitting, to the other apparatus, an accumulated signal strength value associated with the set of signal strength values.

Example 21 may include the method of Example 20, and further including: measuring the set of signal strength values associated with receiving the pilot signals from the other apparatus.

Example 22 may include the method of Example 20, and the information indicating the configured subset of the set of TX beams at the other apparatus can be included in a SIB, a pilot signal, or another broadcast transmission from the other apparatus.

Example 23 may include the method of Example 20, and further including: summing the set of signal strength values to obtain the accumulated signal strength value.

Example 24 may include the method of Example 20, and further including: receiving, from the other apparatus, other pilot signals corresponding to the configured subset of the set of TX beams, and each of at least one other set of signal strength values can be associated with receiving at least one of the other pilot signals from the other apparatus, and the accumulated signal strength value can be further associated with the at least one other set of signal strength values.

Example 25 may include the method of Example 24, and each of the pilot signals can be received via a RX beam of the apparatus, and each of the other pilot signals can be received via at least one other RX beam of the apparatus.

Example 26 may include the method of Example 20, and further including: receiving other pilot signals from the other apparatus, the other pilot signals corresponding to the set of TX beams at the other apparatus; and transmitting, to the other apparatus, information identifying a recommended subset of TX beams of the set of TX beams in association with receiving the other pilot signals, and the configured subset of the set of TX beams can be based on the recommended subset of the set of TX beams.

Example 27 may include the method of Example 20, and further including: estimating a channel covariance matrix using the accumulated signal strength value; and calculating a beamforming vector for communication with the other apparatus using eigenvectors of the channel covariance matrix.

Example 28 may include the method of Example 27, and further including: performing beam training with the other apparatus using the beamforming vector.

Example 29 may include the method of Example 20, and each of the pilot signals can include a SSB or a CSI-RS.

Example 30 may include the method of Example 20, and each of the set of signal strength values can include an RSRP value associated with an L1 or an SS, an RSRQ value, an RSSI value, an SNR value, or an SINR value.

Example 31 may be a method of wireless communication at an apparatus, including: transmitting, to another apparatus, information indicating a configured subset of a set of TX beams at the apparatus; transmitting, to the other apparatus, one of a set of pilot signals via each TX beam of the configured subset of the set of TX beams; and receiving, from the other apparatus, an accumulated signal strength value associated with the set of pilot signals transmitted via the configured subset of the set of TX beams.

Example 32 may include the method of Example 31, and the information indicating the subset of the set of TX beams at the apparatus can be included in a SIB, a pilot signal, or another broadcast transmission.

Example 33 may include the method of Example 31, and further including: transmitting, to the other apparatus, one of another set of pilot signals via each TX beam of the subset of the set of TX beams, and the accumulated signal strength value can be further associated with the other set of pilot signals transmitted via the subset of the set of TX beams.

Example 34 may include the method of Example 31, and further including: transmitting, to the other apparatus, another set of pilot signals via the set of TX beams; receiving, from the other apparatus, information associated with a set of beam pairs of the apparatus and the other apparatus; and configuring the configured subset of the set of TX beams at the apparatus from the set of beam pairs of the apparatus and the other apparatus.

Example 35 may include the method of Example 34, and further including: calculating a norm of an error matrix associated with an identity matrix and TX beams of the set of beam pairs of the apparatus and the other apparatus, and the subset of the set of TX beams can be configured from comparison of the norm with a threshold.

Example 36 may include the method of Example 31, and further including: performing beam training with the other apparatus using the configured subset of the set of TX beams; and calculating a beamforming vector for communication with the other apparatus upon performance of the beam training.

Example 37 may include the method of Example 31, and each of the pilot signals can include a SSB or a CSI-RS.

Example 38 may include the method of Example 31, and the accumulated signal strength value can include an RSRP value associated with an L1 or an SS value, an RSRQ value, an RSSI value, an SNR value, or an SINR value.

Example 39 may be an apparatus for wireless communication, including means for receiving, from another apparatus, information indicating a configured subset of a set of TX beams at the other apparatus; means for receiving, from the other apparatus, pilot signals corresponding to the configured subset of the set of TX beams, each of a set of signal strength values being associated with receiving at least one of the pilot signals; and means for transmitting, to the other apparatus, an accumulated signal strength value associated with the set of signal strength values.

Example 40 may include the apparatus of Example 39, and further including: means for measuring the set of signal strength values associated with receiving the pilot signals from the other apparatus.

Example 41 may include the apparatus of Example 39, and the information indicating the configured subset of the set of TX beams at the other apparatus can be included in a SIB, a pilot signal, or another broadcast transmission from the other apparatus.

Example 42 may include the apparatus of Example 39, and further including: means for summing the set of signal strength values to obtain the accumulated signal strength value.

Example 43 may include the apparatus of Example 39, and further including: means for receiving, from the other apparatus, other pilot signals corresponding to the configured subset of the set of TX beams, and each of at least one other set of signal strength values can be associated with receiving at least one of the other pilot signals from the other apparatus, and the accumulated signal strength value can be further associated with the at least one other set of signal strength values.

Example 44 may include the apparatus of Example 43, and each of the pilot signals can be received via a RX beam of the apparatus, and each of the other pilot signals can be received via at least one other RX beam of the apparatus.

Example 45 may include the apparatus of Example 39, and further including: means for receiving other pilot signals from the other apparatus, the other pilot signals corresponding to the set of TX beams at the other apparatus; and means for transmitting, to the other apparatus, information identifying a recommended subset of TX beams of the set of TX beams in association with receiving the other pilot signals, and the configured subset of the set of TX beams can be based on the recommended subset of the set of TX beams.

Example 46 may include the apparatus of Example 39, and further including: means for estimating a channel covariance matrix using the accumulated signal strength value; and means for calculating a beamforming vector for communication with the other apparatus using eigenvectors of the channel covariance matrix.

Example 47 may include the apparatus of Example 46, and further including: means for performing beam training with the other apparatus using the beamforming vector.

Example 48 may include the apparatus of Example 39, and each of the pilot signals can include a SSB or a CSI-RS.

Example 49 may include the apparatus of Example 39, and each of the set of signal strength values can include an RSRP value associated with an L1 or an SS value, an RSRQ value, an RSSI value, an SNR value, or an SINR value.

Example 50 may be an apparatus for wireless communication, including: means for transmitting, to another apparatus, information indicating a configured subset of a set of TX beams at the apparatus; means for transmitting, to the other apparatus, one of a set of pilot signals via each TX beam of the configured subset of the set of TX beams; and means for receiving, from the other apparatus, an accumulated signal strength value associated with the set of pilot signals transmitted via the configured subset of the set of TX beams.

Example 51 may include the apparatus of Example 50, and the information indicating the subset of the set of TX beams at the apparatus can be included in a SIB, a pilot signal, or another broadcast transmission.

Example 52 may include the apparatus of Example 50, and further including: means for transmitting, to the other apparatus, one of another set of pilot signals via each TX beam of the subset of the set of TX beams, and the accumulated signal strength value can be further associated with the other set of pilot signals transmitted via the subset of the set of TX beams.

Example 53 may include the apparatus of Example 50, and further including: means for transmitting, to the other apparatus, another set of pilot signals via the set of TX beams; means for receiving, from the other apparatus, information associated with a set of beam pairs of the apparatus and the other apparatus; and means for configuring the configured subset of the set of TX beams at the apparatus from the set of beam pairs of the apparatus and the other apparatus.

Example 54 may include the apparatus of Example 53, and further including: means for calculating a norm of an error matrix associated with an identity matrix and TX beams of the set of beam pairs of the apparatus and the other apparatus, and the subset of the set of TX beams can be configured from comparison of the norm with a threshold.

Example 55 may include the apparatus of Example 50, and further including: means for performing beam training with the other apparatus using the configured subset of the set of TX beams; and means for calculating a beamforming vector for communication with the other apparatus upon performance of the beam training.

Example 56 may include the apparatus of Example 50, and each of the pilot signals can include a SSB or a CSI-RS.

Example 57 may include the apparatus of Example 50, and the accumulated signal strength value can include an RSRP value associated with an L1 or an SS value, an RSRQ value, an RSSI value, an SNR value, or an SINR value.

Example 58 may be a computer-readable medium storing computer-executable code for wireless communication at an apparatus, the code when executed by a processor cause the processor to: receive, from another apparatus, information indicating a configured subset of a set of TX beams at the other apparatus; receive, from the other apparatus, pilot signals corresponding to the configured subset of the set of TX beams, each of a set of signal strength values being associated with receiving at least one of the pilot signals; and transmit, to the other apparatus, an accumulated signal strength value associated with the set of signal strength values.

Example 59 may include the computer-readable medium of Example 58, and the code, when executed by the processor, is to further cause the processor to: measure the set of signal strength values associated with receiving the pilot signals from the other apparatus.

Example 60 may include the computer-readable medium of Example 58, and the information indicating the configured subset of the set of TX beams at the other apparatus can be included in a SIB, a pilot signal, or another broadcast transmission from the other apparatus.

Example 61 may include the computer-readable medium of Example 58, and the code, when executed by the processor, is to further cause the processor to: sum the set of signal strength values to obtain the accumulated signal strength value.

Example 62 may include the computer-readable medium of Example 58, and the code, when executed by the processor, is to further cause the processor to: receive, from the other apparatus, other pilot signals corresponding to the configured subset of the set of TX beams, and each of at least one other set of signal strength values can be associated with receiving at least one of the other pilot signals from the other apparatus, and the accumulated signal strength value can be further associated with the at least one other set of signal strength values.

Example 63 may include the computer-readable medium of Example 62, and each of the pilot signals can be received via a RX beam of the apparatus, and each of the other pilot signals can be received via at least one other RX beam of the apparatus.

Example 64 may include the computer-readable medium of Example 58, and the code, when executed by the processor, is to further cause the processor to: receive other pilot signals from the other apparatus, the other pilot signals corresponding to the set of TX beams at the other apparatus; and transmit, to the other apparatus, information identifying a recommended subset of TX beams of the set of TX beams in association with receiving the other pilot signals, and the configured subset of the set of TX beams can be based on the recommended subset of the set of TX beams.

Example 65 may include the computer-readable medium of Example 58, and the code, when executed by the processor, is to further cause the processor to: estimate a channel covariance matrix using the accumulated signal strength value; and calculate a beamforming vector for communication with the other apparatus using eigenvectors of the channel covariance matrix.

Example 66 may include the computer-readable medium of Example 65, and the code, when executed by the processor, is to further cause the processor to: perform beam training with the other apparatus using the beamforming vector.

Example 67 may include the computer-readable medium of Example 58, and each of the pilot signals can include a SSB or a CSI-RS.

Example 68 may include the computer-readable medium of Example 58, and each of the set of signal strength values can include an RSRP value associated with an L1 or an SS value, an RSRQ value, an RSSI value, an SNR value, or an SINR value.

Example 69 may be a computer-readable medium storing computer-executable code for wireless communication at an apparatus, the code when executed by a processor cause the processor to: transmit, to another apparatus, information indicating a configured subset of a set of TX beams at the apparatus; transmit, to the other apparatus, one of a set of pilot signals via each TX beam of the configured subset of the set of TX beams; and receive, from the other apparatus, an accumulated signal strength value associated with the set of pilot signals transmitted via the configured subset of the set of TX beams.

Example 70 may include the computer-readable medium of Example 69, and the information indicating the subset of the set of TX beams at the apparatus can be included in a SIB, a pilot signal, or another broadcast transmission.

Example 71 may include the computer-readable medium of Example 69, and the code, when executed by the processor, is to further cause the processor to: transmit, to the other apparatus, one of another set of pilot signals via each TX beam of the subset of the set of TX beams, and the accumulated signal strength value can be further associated with the other set of pilot signals transmitted via the subset of the set of TX beams.

Example 72 may include the computer-readable medium of Example 69, and the code, when executed by the processor, is to further cause the processor to: transmit, to the other apparatus, another set of pilot signals via the set of TX beams; receive, from the other apparatus, information associated with a set of beam pairs of the apparatus and the other apparatus; and configure the configured subset of the set of TX beams at the apparatus from the set of beam pairs of the apparatus and the other apparatus.

Example 73 may include the computer-readable medium of Example 72, and the code, when executed by the processor, is to further cause the processor to: calculate a norm of an error matrix associated with an identity matrix and TX beams of the set of beam pairs of the apparatus and the other apparatus, and the subset of the set of TX beams can be configured from comparison of the norm with a threshold.

Example 74 may include the computer-readable medium of Example 69, and the code, when executed by the processor, is to further cause the processor to: perform beam training with the other apparatus using the configured subset of the set of TX beams; and calculate a beamforming vector for communication with the other apparatus upon performance of the beam training.

Example 75 may include the computer-readable medium of Example 69, and each of the pilot signals can include a SSB or a CSI-RS.

Example 76 may include the computer-readable medium of Example 69, and the accumulated signal strength value can include an RSRP value associated with an L1 or an SS value, an RSRQ value, an RSSI value, an SNR value, or an SINR value.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, reduced instruction set computing (RISC) processor, graphics processing unit (GPU), or any other conventional processor, controller, microcontroller, or state machine. A processor also may be implemented as a combination of computing devices, such as a combination of a DSP and a microprocessor, a plurality of microprocessors, one or more microprocessors in conjunction with a DSP core, a system on a chip (SoC), or any other such configuration. In some implementations, particular processes and methods may be performed by a chip, integrated circuit, or other circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as by one or more modules of computer program instructions, encoded on a computer storage media for execution by, or to control the operation of, data processing apparatus.

If implemented in software, the functions may be stored on or transmitted over as one or more instructions or code on a computer-readable medium. In the context of the present disclosure, software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to a person having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a processing system configured to:
receive, through a first interface, information obtained from another apparatus indicating a configured subset of a set of transmit (TX) beams at the another apparatus;
receive, through the first interface, a first set of pilot signals obtained from the another apparatus corresponding to the configured subset of the set of TX beams, each of a set of signal strength values being associated with receiving at least one of the first set of pilot signals; and
receive, through the first interface, a second set of pilot signals via the set of TX beams; and
a second interface connected to the processing system and configured to:
transmit, to the another apparatus, information associated with a set of beam pairs of the apparatus and the another apparatus,
wherein the configured subset of the set of transmit (TX) beams is configured, by the another apparatus, in accordance with: comparing a norm of an error matrix, associated with an identity matrix and the set of TX beams of the set of beam pairs of the apparatus and the another apparatus, with a threshold.

2. The apparatus of claim 1, wherein the processing system is further configured to:
measure the set of signal strength values associated with receiving the first set of pilot signals from the another apparatus.

3. The apparatus of claim 1, wherein the information indicating the configured subset of the set of TX beams at the another apparatus is included in a system information block (SIB), a pilot signal, or another broadcast transmission from the another apparatus.

4. The apparatus of claim 1, wherein the processing system is further configured to:
receive, through the first interface, other pilot signals obtained from the another apparatus corresponding to the configured subset of the set of TX beams, wherein each of at least one other set of signal strength values is associated with receiving at least one of the other pilot signals from the another apparatus.

5. The apparatus of claim 4, wherein each of the first set of pilot signals is obtained via a receive (RX) beam of the apparatus, and each of the other pilot signals is obtained via at least one other RX beam of the apparatus.

6. The apparatus of claim 1, wherein the processing system is further configured to receive, through the first interface, other pilot signals from the another apparatus, the other pilot signals corresponding to the set of TX beams at the another apparatus, and
the second interface is further configured to transmit, to the another apparatus, information identifying a recommended subset of TX beams of the set of TX beams in association with receiving the other pilot signals, wherein the configured subset of the set of TX beams is based on the recommended subset of the set of TX beams.

7. The apparatus of claim 1, wherein the processing system is further configured to:
calculate a beamforming vector for communication with the another apparatus using eigenvectors of a channel covariance matrix.

8. The apparatus of claim 7, wherein the processing system is further configured to:
perform beam training with the another apparatus using the beamforming vector.

9. The apparatus of claim 1, wherein each of the first set of pilot signals comprises a synchronization signal block (SSB) or a channel state information reference signal (CSI-RS).

10. The apparatus of claim 1, wherein each of the set of signal strength values comprises a Reference Signal Received Power (RSRP) value associated with a Layer-1 (L1) or a synchronization signal (SS), a Reference Signal Received Quality (RSRQ) value, a Reference Signal Strength Indicator (RSSI) value, a signal-to-noise ratio (SNR) value, or a signal-to-interference-and-noise ratio (SINR) value.

11. An apparatus for wireless communication, comprising:
a first interface connected to a processing system and configured to:
transmit, to another apparatus, information indicating a configured subset of a set of transmit (TX) beams at the apparatus;
transmit, to the another apparatus, one of a first set of pilot signals via each TX beam of the configured subset of the set of TX beams; and
transmit, to the another apparatus, a second set of pilot signals via the set of TX beams; and
the processing system configured to:
receive, through a second interface from the another apparatus, information associated with a set of beam pairs of the apparatus and the another apparatus;
configure the configured subset of the set of TX beams at the apparatus from the set of beam pairs of the apparatus and the another apparatus; and
calculate a norm of an error matrix associated with an identity matrix and the set of TX beams of the set of beam pairs of the apparatus and the another apparatus, wherein
the subset of the set of TX beams is configured from comparison of the norm with a threshold.

12. The apparatus of claim 11, wherein the information indicating the subset of the set of TX beams at the apparatus is included in a system information block (SIB), a pilot signal, or another broadcast transmission.

13. The apparatus of claim 11, wherein the first interface is further configured to:
transmit, to the another apparatus, one of the second set of pilot signals via each TX beam of the configured subset of the set of TX beams, wherein
an output signal strength value is further associated with the second set of pilot signals output via the configured subset of the set of TX beams.

14. The apparatus of claim 11, wherein the processing system is further configured to:
perform beam training with the another apparatus using the configured subset of the set of TX beams; and
calculate a beamforming vector for communication with the another apparatus upon performance of the beam training.

15. The apparatus of claim 11, wherein each of the first set of pilot signals comprises a synchronization signal block (SSB) or a channel state information reference signal (CSI-RS).

16. A method of wireless communication at an apparatus, comprising:
- receiving, from another apparatus, information indicating a configured subset of a set of transmit (TX) beams at the another apparatus;
- receiving, from the another apparatus, a first set of pilot signals obtained from the another apparatus corresponding to the configured subset of the set of TX beams, each of a set of signal strength values being associated with receiving at least one of the first set of pilot signals;
- receiving, from the another apparatus, a second set of pilot signals via the set of TX beams;
- transmitting, to the another apparatus, information associated with a set of beam pairs of the apparatus and the another apparatus,
- wherein the configured subset of the set of transmit (TX) beams is configured, by the another apparatus, based on: calculating a norm of an error matrix associated with an identity matrix and the set of TX beams of the set of beam pairs of the apparatus and the another apparatus; and comparing the norm with a threshold.

17. The method of claim 16, further comprising:
- receiving, from the another apparatus, other pilot signals corresponding to the configured subset of the set of TX beams, wherein
- each of at least one other set of signal strength values is associated with receiving at least one of the other pilot signals from the another apparatus.

18. The method of claim 17, wherein each of the first set of pilot signals is received via a receive (RX) beam of the apparatus, and each of the other pilot signals is received via at least one other RX beam of the apparatus.

19. The method of claim 16, further comprising:
- receiving other pilot signals from the another apparatus, the other pilot signals corresponding to the set of TX beams at the another apparatus; and
- transmitting, to the another apparatus, information identifying a recommended subset of TX beams of the set of TX beams in association with receiving the other pilot signals, wherein
- the configured subset of the set of TX beams is based on the recommended subset of the set of TX beams.

20. The method of claim 16, further comprising:
- calculating a beamforming vector for communication with the another apparatus using eigenvectors of a channel covariance matrix.

21. A method of wireless communication at an apparatus, comprising:
- transmitting, to another apparatus, information indicating a configured subset of a set of transmit (TX) beams at the apparatus;
- transmitting, to the another apparatus, one of a first set of set of pilot signals via each TX beam of the configured subset of the set of TX beams;
- transmitting, to the another apparatus, a second set of pilot signals via the set of TX beams;
- receiving, from the another apparatus, information associated with a set of beam pairs of the apparatus and the another apparatus;
- configuring the configured subset of the set of TX beams at the apparatus from the set of beam pairs of the apparatus and the another apparatus; and
- calculating a norm of an error matrix associated with an identity matrix and the set of TX beams of the set of beam pairs of the apparatus and the another apparatus, wherein
- the subset of the set of TX beams is configured from comparison of the norm with a threshold.

22. The method of claim 21, further comprising:
- transmitting, to the another apparatus, one of another set of pilot signals via each TX beam of the subset of the set of TX beams.

23. The method of claim 21, further comprising:
- performing beam training with the another apparatus using the configured subset of the set of TX beams; and
- calculating a beamforming vector for communication with the another apparatus upon performance of the beam training.

* * * * *